US011974956B2

(12) United States Patent
Lawrie

(10) Patent No.: US 11,974,956 B2
(45) Date of Patent: May 7, 2024

(54) MASSAGE GUN AND MASSAGE GUN EXTENSION ARM

(71) Applicant: Nathan Lawrie, Santa Barbara, CA (US)

(72) Inventor: Nathan Lawrie, Santa Barbara, CA (US)

(*) Notice: Subject to any disclaimer, the term of this patent is extended or adjusted under 35 U.S.C. 154(b) by 0 days.

(21) Appl. No.: 17/552,195

(22) Filed: Dec. 15, 2021

(65) Prior Publication Data

US 2022/0104997 A1 Apr. 7, 2022

Related U.S. Application Data

(63) Continuation-in-part of application No. 17/327,596, filed on May 21, 2021, now abandoned.

(60) Provisional application No. 63/028,383, filed on May 21, 2020.

(51) Int. Cl.

| | |
|---|---|
| ***A61H 23/00*** | (2006.01) |
| ***A61H 7/00*** | (2006.01) |
| ***A61H 37/00*** | (2006.01) |
| ***B25G 1/04*** | (2006.01) |
| ***B25G 1/10*** | (2006.01) |
| ***B25G 3/34*** | (2006.01) |
| ***B25G 3/38*** | (2006.01) |

(52) U.S. Cl.

CPC ........... *A61H 23/006* (2013.01); *A61H 7/003* (2013.01); *A61H 37/00* (2013.01); *B25G 1/04* (2013.01); *B25G 1/102* (2013.01); *B25G 3/34* (2013.01); *B25G 3/38* (2013.01); *A61H 2201/0153* (2013.01); *A61H 2201/0161* (2013.01); *A61H 2205/062* (2013.01); *A61H 2205/081* (2013.01)

(58) Field of Classification Search

CPC ...... A61H 7/003; A61H 23/006; A61H 37/00; A61H 2201/0153; A61H 2201/0161; A61H 2205/062; A61H 2205/081; B25G 1/04; B25G 1/102; B25G 3/34; B25G 3/38

See application file for complete search history.

(56) References Cited

U.S. PATENT DOCUMENTS 4,381,766 A * 5/1983 Avolio .................. A47K 7/028
15/210.1
4,669,452 A * 6/1987 Osawa .............. A61H 23/0263
601/46
D326,525 S * 5/1992 Shimizu ....................... D24/214

(Continued)

*Primary Examiner* — Colin W Stuart
*Assistant Examiner* — Matthew D Ziegler
(74) *Attorney, Agent, or Firm* — Patent Service Associates, Inc.; Lyman Smith

(57) ABSTRACT

A massage gun and a massage gun extension arm having a handle end that can extend through a first bend and further extend to terminate at an attachment end. Various attachment mechanisms may be used to connect the massage gun extension arm to the massage gun, or to a separate massage tool. The massage gun extension arm can include a telescoping adjustment along the portion between the bend and the handle end, or between the bend and the attachment end. In some embodiments, the arm, between the bend and the handle end, can include a disconnection, the disconnection being in the form of a pivoting bend or in a complete disconnection of parts. This disconnection allows for ease of transport, with the massage gun extension arm stored and carried in a relatively small footprint.

9 Claims, 33 Drawing Sheets

(56) References Cited

U.S. PATENT DOCUMENTS

| | | | | |
|---|---|---|---|---|
| 5,117,815 | A * | 6/1992 | Gentry | A61H 7/005 601/138 |
| 6,432,072 | B1 * | 8/2002 | Harris | A61H 23/0254 601/111 |
| 7,122,015 | B2 * | 10/2006 | Luettgen | A61H 23/0254 601/72 |
| 7,937,792 | B2 * | 5/2011 | Munn | A46B 13/001 15/49.1 |
| 8,313,424 | B2 * | 11/2012 | Gabrielidis | A61H 19/40 600/38 |
| 9,168,196 | B2 * | 10/2015 | Dagan | A61H 39/04 |
| 9,532,918 | B1 * | 1/2017 | Louis | A61H 7/003 |
| 10,442,072 | B2 * | 10/2019 | Kemp | A61H 37/00 |
| 10,952,921 | B1 * | 3/2021 | Kesner | A61H 23/02 |
| 10,959,908 | B2 * | 3/2021 | Lee | A61H 23/02 |
| 2004/0215115 | A1 * | 10/2004 | Sheen | A61H 7/001 601/135 |
| 2006/0116614 | A1 * | 6/2006 | Jones | A61H 15/0085 601/80 |
| 2011/0087140 | A1 * | 4/2011 | Lee | A61H 7/001 601/137 |
| 2019/0060162 | A1 * | 2/2019 | Martin | A61H 23/02 |

* cited by examiner

MASSAGE GUN AND MASSAGE GUN EXTENSION ARM

CROSS-REFERENCE TO RELATED APPLICATIONS

This application is a continuation-in-part of U.S. patent application Ser. No. 17/327,596, filed May 21, 2021, which claims the benefit of U.S. provisional application No. 63/028,383, filed May 21, 2020, the contents of both of which are herein incorporated by reference.

BACKGROUND OF THE INVENTION

1. Field of the Invention

Embodiments of the invention relate generally to massage guns and massage gun accessories. More particularly, embodiments of the invention relate to a portable, telescoping, rigid-locking, compact, stowable massage gun attachment and a massage gun with a pivotable handle.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Over the past several years, massage guns, also referred to as percussion massagers, have become an important tool for individuals that need an easy way to address muscle stiffness, muscle soreness, myofascial adhesions, and physical mobility issues. They are commonly used by athletes and general fitness seekers for warm-up, cool down, and muscle/joint recovery. They are also commonly used for rehabilitation by physical therapy practitioners on those suffering musculoskeletal issues.

While the massage gun has become a broadly accepted and well-loved tool, they have one major flaw—they are difficult to use on back muscles and lower extremities. Massage guns are typically formed in a gun-like shape, with a pulsating massage head configured at the end of the "chamber" portion of the gun and a handle protruding generally perpendicularly to the chamber. The gun-like shape makes it easy for users to hold and use on front of the body muscles, but reaching the back muscles means a user has to hold the massage gun in an uncomfortable and tiring position for an extended period of time. Further, there are many places on the back that cannot be reached at all without significantly contorting the body to reach them. Typically, a user will need to recruit a partner to help them massage their back comfortably, however a partner is not always handy or willing.

Therefore, there remains a need to combine all the great benefits of a traditional massage gun, which is compact and easy to use on the front of the body in its typical form, with an easy to attach and readily removed extension arm. Such an extension arm should be designed to permit a user to conveniently and comfortably reach locations on the body that would otherwise be difficult to reach.

There remains a need for an extension arm connection system that is robust enough to withstand the repeated force of the massage gun percussion with a user pulling on the handle with up to 75 pounds of force. The connection system should be easy and quick to operate while providing enough strength to ensure the durability of the system. It should hold the massage gun such that the massage head is reciprocating generally parallel or at a slight negative, or inward, angle to the pulling force of the user on the extension handle.

SUMMARY OF THE INVENTION

Embodiments of the present invention provide a massage gun extension arm comprising a handle portion with a first end and a distal end; a bent portion having a bent portion proximate end attached to the distal end of the handle portion; a bend formed in the bent portion, the bend forming an angle from about 60 to about 120 degrees; and a massage gun connector disposed on a bent portion distal end of the bent portion. In some embodiments, the handle portion can be formed integrally and inseparably with the bent portion. In other embodiments, the handle portion can be a component separable from the bent portion.

Embodiments of the present invention further provide massage gun extension arm comprising a handle portion with a first end and a distal end; a bent portion having a bent portion proximate end pivotably attached to the distal end of the handle portion; a bend formed in the bent portion, the bend forming an angle from about 60 to about 120 degrees; and a massage gun connector disposed on a bent portion distal end of the bent portion, wherein the handle portion is securable into a use position, wherein inadvertent pivoting between the handle portion and the bent portion is prevented; the handle portion is foldable into a storage position, wherein the handle portion is disposed along-side of the bent portion with the handle portion first end disposed adjacent the bend; and the bent portion is disposed to pivot on a first axis at a first end of a pivoting member and the handle portion is pivotable to disposed to pivot on a second axis at a second end of the pivoting member.

Embodiments of the present invention also provide a massage system comprising a massage gun extension arm including a handle portion with a first end and a distal end, a bent portion having a bent portion proximate end attached to the distal end of the handle portion, a bend formed in the bent portion, the bend forming an angle from about 60 to about 120 degrees, and a massage gun connector disposed on a bent portion distal end of the bent portion; and a massage gun including a massage gun handle having a massage gun handle distal end removably attachable to the massage gun connector, and a massage head assembly having a longitudinal axis forming an angle with the massage gun handle.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
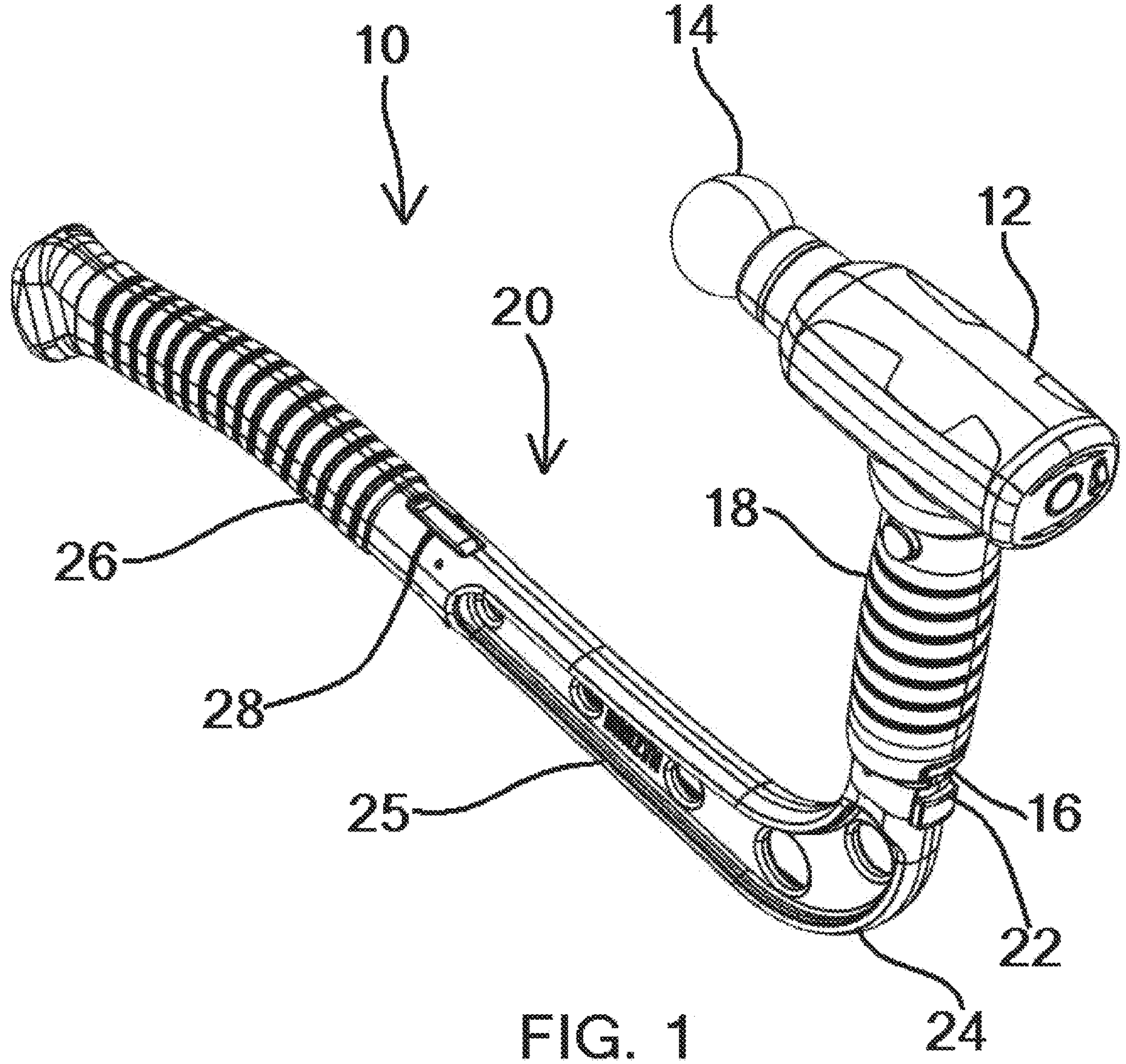
FIG. 1 illustrates a perspective view of a massage gun with an angled, folding massage gun arm, according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any apparatus, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a massage gun and a massage gun extension arm having a handle end that can extend through a first bend and further extend to terminate at an attachment end. Various attachment mechanisms may be used to connect the massage gun extension arm to the massage gun, or to a separate massage tool. The massage gun extension arm can include a telescoping adjustment along the portion between the bend and the handle end, or between the bend and the attachment end. In some embodiments, the arm, between the bend and the handle end, can include a disconnection, the disconnection being in the form of a pivoting bend or in a complete disconnection of parts. This disconnection allows for ease of transport, with the massage gun extension arm stored and carried in a relatively small footprint.

Generally, a massage gun can include a massage head that may be replaceable as may be known in the art. The massage gun can include a massage gun body generally in line with the massage head. The massage gun can further include a massage gun handle that extends at an angle from the massage gun body. In some embodiments, the massage gun handle of the present invention may be able to pivot and lock into a plurality of positions.

In some embodiments, the number of positions may be fixed and the user may move the massage gun handle into a desired position and lock it into place. In other embodiments, the massage gun handle may pivot and may be set an any angle along the pivot swing. Various mechanisms may be used to provide the pivoting handle and the ability to lock the handle in the desired angular configuration.

Figure 2:
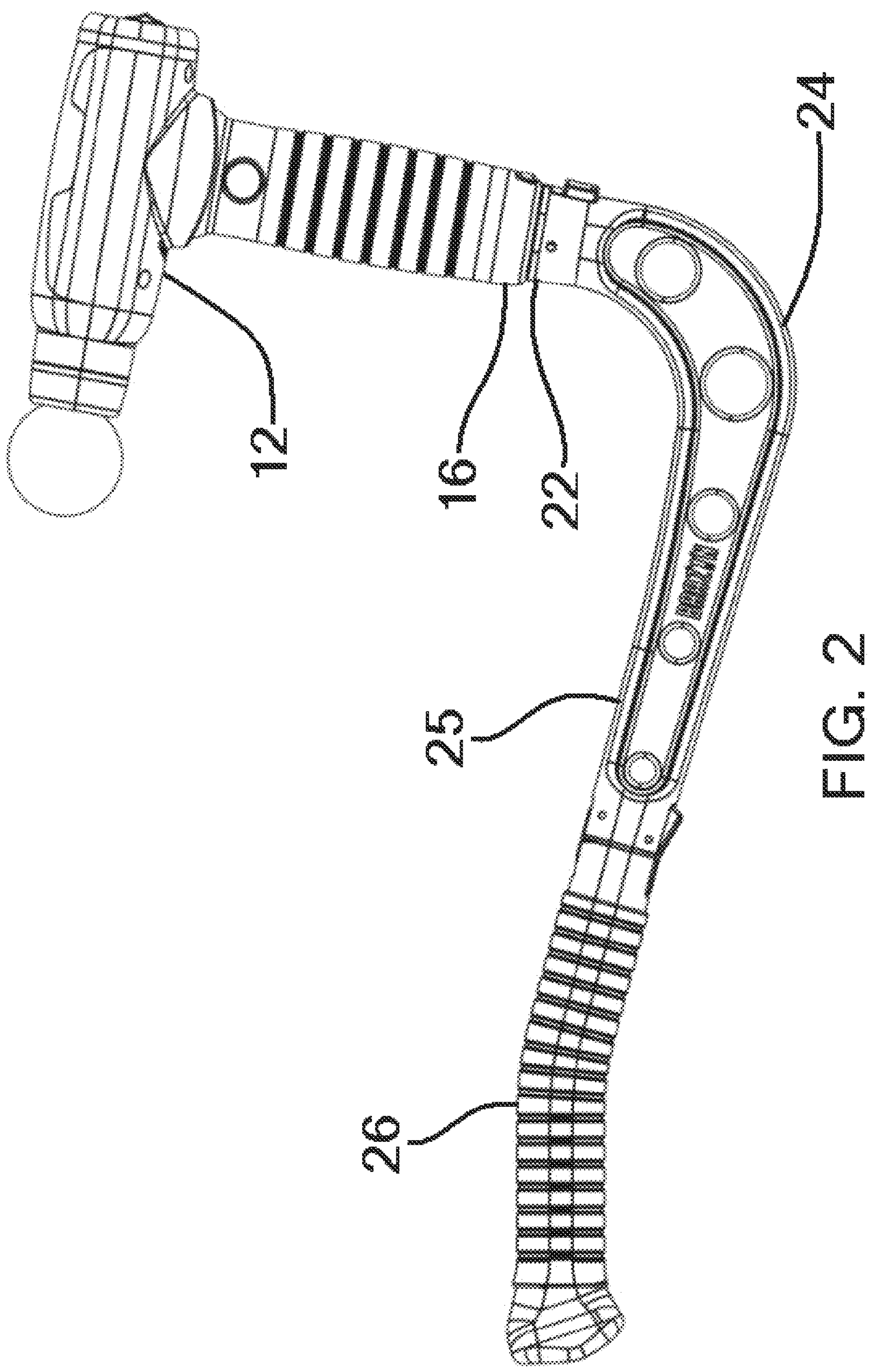
FIG. 2 illustrates a side view of the massage gun with an angled, folding massage gun arm of FIG. 1.
Figure 3:
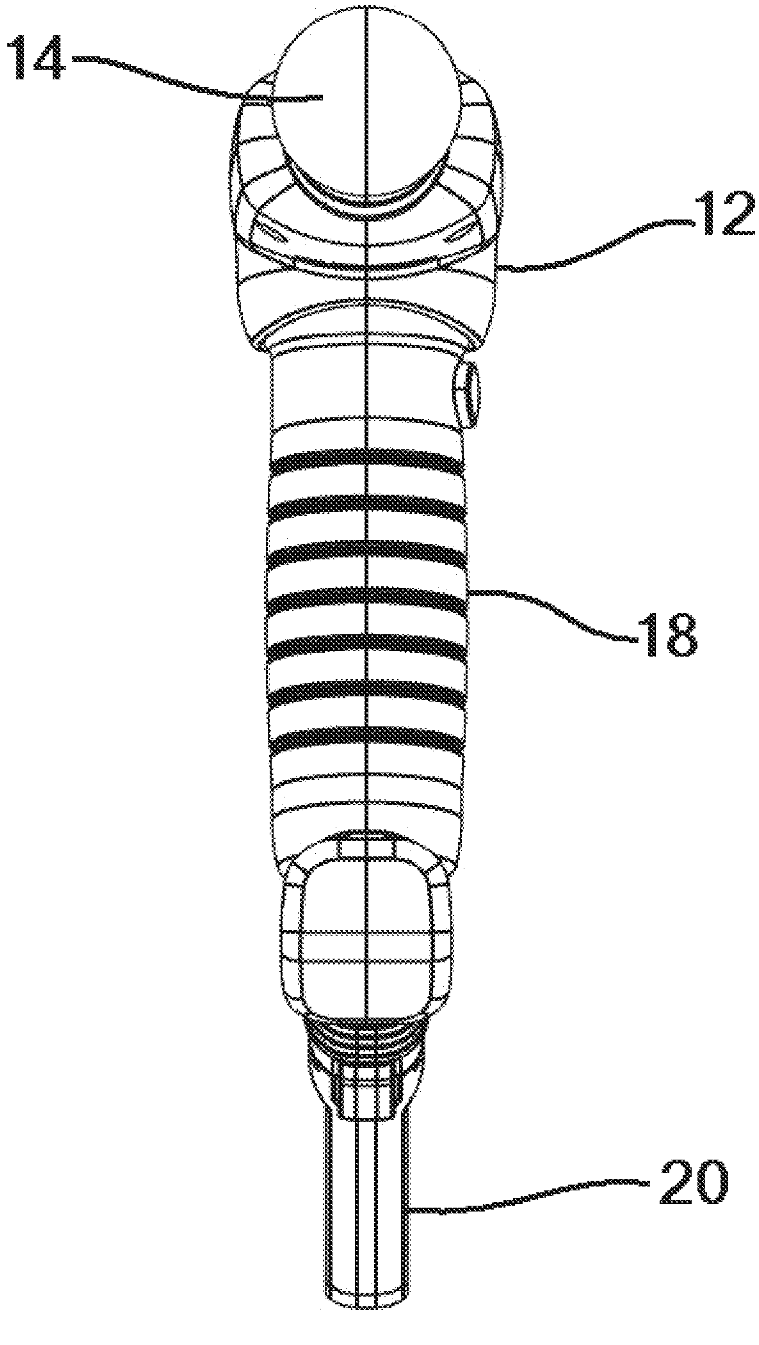
FIG. 3 illustrates a front view of the massage gun with an angled, folding massage gun arm of FIG. 1.
Figure 4:
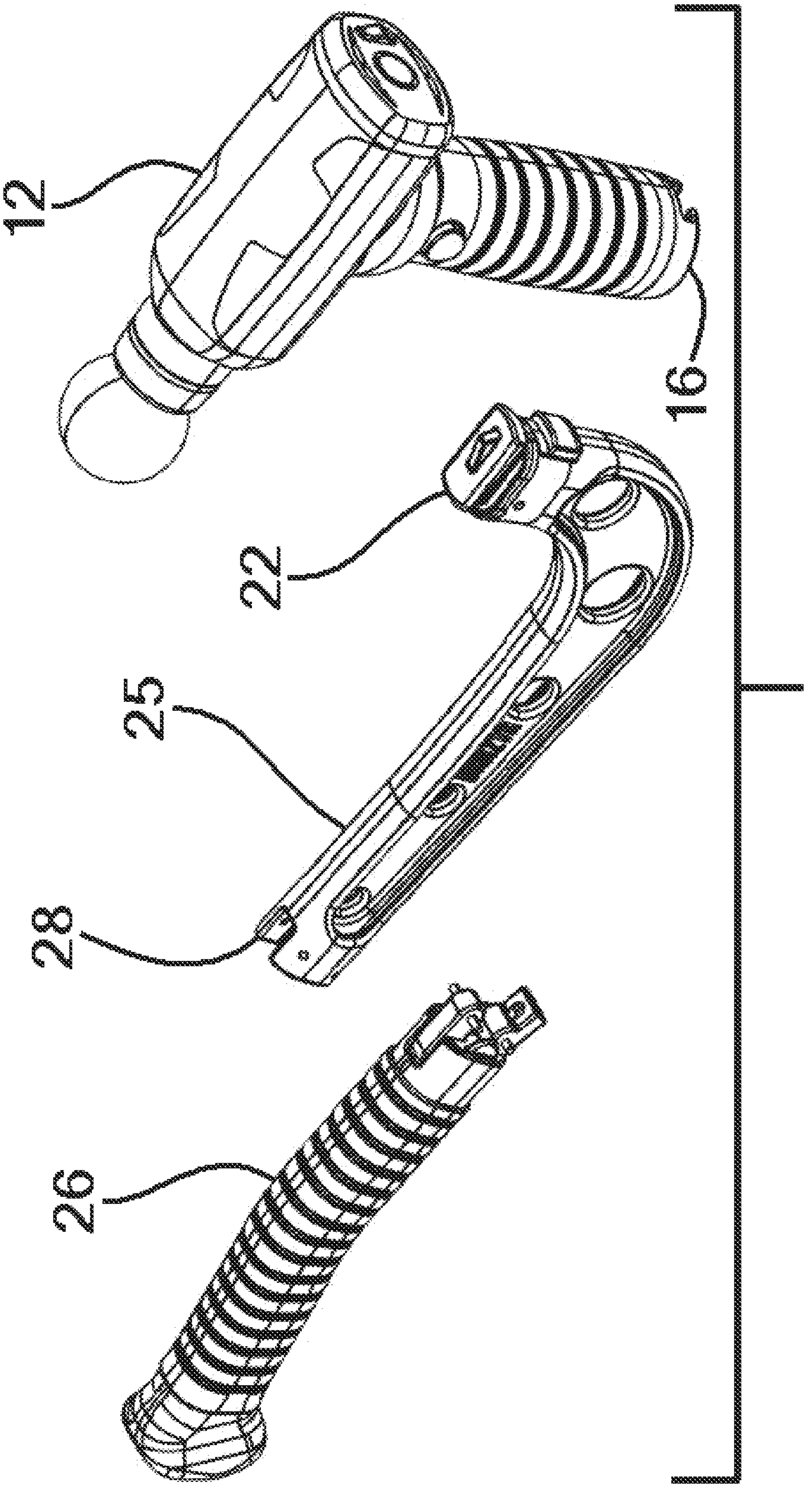
FIG. 4 illustrates an exploded perspective view of the massage gun with an angled, folding massage gun arm of FIG. 1.
Figure 5:
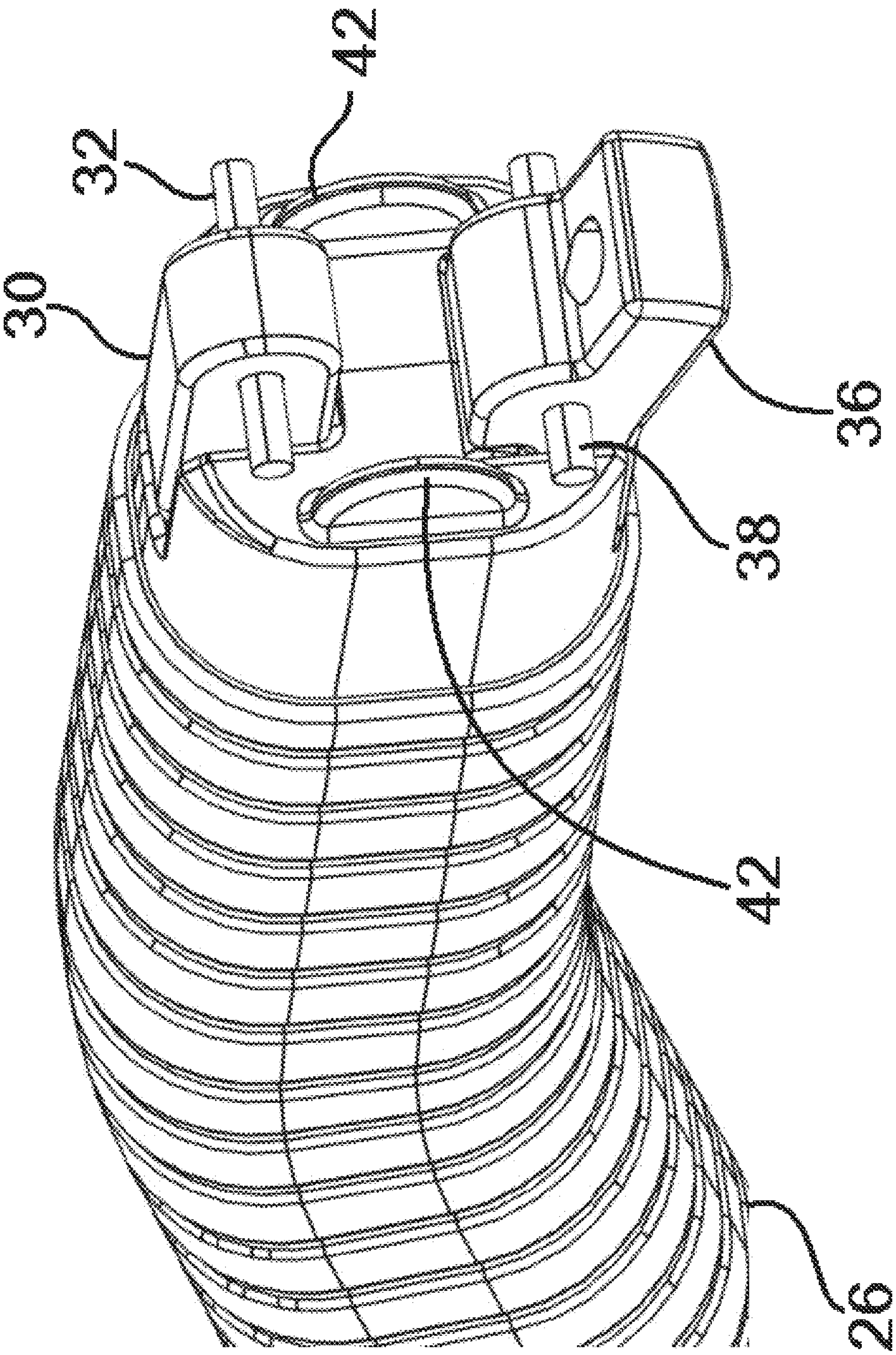
FIG. 5 illustrates a detailed end view of a handle member attachment end of the massage gun with an angled, folding massage gun arm of FIG. 1.
Figure 6:
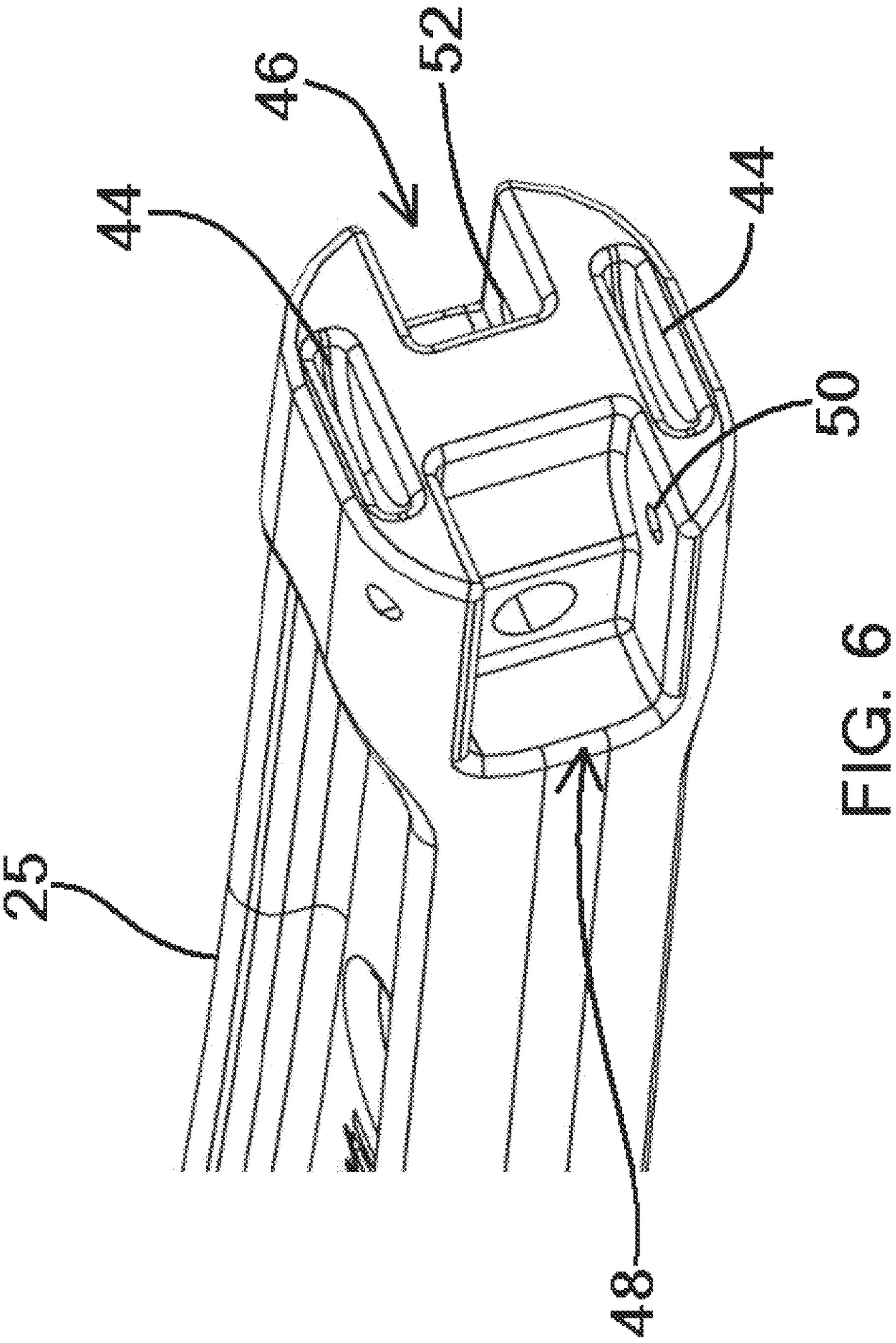
FIG. 6 illustrates a detailed end view of a bent portion attachment end of the massage gun with an angled, folding massage gun arm of FIG. 1.

The massage gun handle may pivot from about 10 degrees to about 45 degrees forward and from about 10 degrees to about 45 degrees backwards from a base configuration where the massage gun handle is orthogonal to the massage gun body (as shown in FIGS. 1 and 2, for example).

An extension arm for a massage gun can include a massage gun attachment end that extends to a fixed bend, typically from about 60 to about 120 degrees, often about 80 to 100 degrees, typically about 90 degrees. The handle extends from the fixed bend to a handle for a user. A pivot joint may be provided along the extension from the fixed bend to the handle. The pivot joint may permit the handle to be folded for storage, travel, or the like.

The pivot joint may be configured as a removable connection, where a pin may pivot and the pin may fit into the grip portion of the handle. Of course, other pivot joint configurations, as may be known in the art, may be used in various embodiments of the present invention.

In some embodiments, a massage gun extension arm (also referred to simply as "extension arm") can include a handle end with a first arm portion extending from the handle end to an arm bend. The extension arm can further include a second arm portion extending from the arm bend to an attachment end. The arm bend forms the extension arm in an L or 7 shape. The arm bend can take various forms, provided that the arm bend can be moved between at least a use position and a folded position. In the use position, the arm bend can form an angle between the first and second arm portions between about 45 and about 120 degrees, typically from about 45 to about 90 degrees. In the folded position, the arm bend can form an angle between the first and second arm portions between about zero and about 10 degrees, for example. The arm bend may be a snap lock type of hinge or may be a variably adjustable hinge, where the angle may be adjusted and locked into a desired angle.

The first arm portion can include a grip portion proximal the handle end thereof. The grip portion may include a foam or rubber grip material, knurled surfaces, finger grooves, or the like.

The first arm portion can include a disconnect along a length thereof, typically near a central portion of the length of the first arm portion. The disconnect may be a pivoting bend, wherein, when in the extended (in-use) position, the first arm may be generally continuous along its length, whereas in its folded position, the first arm may fold to permit ease of storage and/or transport.

Various types of connections may be used for the pivoting bend as the disconnect in the first arm portion. The pivoting bend may be a snap lock type of hinge, for example.

In some embodiments, a two-piece design can be provided where the disconnect along the first arm portion may be a complete disconnect, where the first arm portion may be separated into two pieces. When connected, the disconnect can include features, such as protrusions, channels, friction fit, or the like, that can prevent inadvertent disconnection of the disconnect.

In some embodiments, the arm may be a solid arm, without any pivoting bend.

In some embodiments, the first arm portion may have an adjustable length. For example, the first arm portion, between the pivoting bend and the arm bend may telescope to provide a variable length. Various mechanisms, as may be known in the art, may be used to provide such a telescoping structure.

In some embodiments, a thumb screw, or the like, may be used to connect the attachment end of the extension arm with the massage gun. This type of connection can provide the ability to pivot the massage gun to the desired angle relative to the second arm portion. Other connections, including those discussed below and those contemplated to one skilled in the art, may be used to connect the massage gun to the extension arm.

Various connections may be used to connect the massage gun attachment end of the handle with the massage gun. In some embodiments, a ball and socket connector may be disposed between the massage gun attachment end of the handle and the massage gun. The ball and socket connector may permit angular adjustment of the massage gun. Turning to loosen an exterior nut of the ball and socket connector can permit adjustment of the angle and tightening the nut can lock in a desired angular orientation.

In some embodiments, an extension arm may be designed with a ball joint at the attachment end thereof. The ball joint may be configured to attach directly to a massage gun having a mating connector thereon. The ball joint may permit multiple degrees of freedom for the movement of the massage gun with respect to the extension arm. The ball joint may operate as known in the art, with an external nut that may be loosened to permit movement and tightened to restrict/prevent movement.

In some embodiments, for example, when the massage gun is not so designed to mate with the ball joint, a ball joint may be provided in the massage gun with a distal massage gun universal connector. The universal connector may take various forms, provided that a typical massage gun may be readily attached thereto and removed therefrom. For example, the universal connector can include a strap that may wrap about a portion of the handle of the massage gun. The strap may be made from a non-slip material, such as rubber, to prevent movement when the strap is tightened about the handle.

In some embodiments, the massage gun attachment end of the arm can include a twist lock connector between the massage gun and the extension arm. Similar to the universal connector above, in some embodiments, the twist lock feature can be provided by using a universal connector, removably attached to the massage gun, having a first twist lock connector, and by providing an attachment end of the extension arm with a second twist lock connector, mating with the first twist lock connector. In this way, a twist lock connection may be provided on a typical massage gun that does not have a built-in connector.

The below, referring to the various figures, describes exemplary embodiments of the present invention. While referencing certain elements in the figures, it should be understood that the present invention is not limited by the specific embodiments as shown, but may include the various configurations as described herein and as known in the art.

Referring now to FIGS. 1 through 11, a massage gun system 10 can include a massage gun 12, having a massage gun head 14 and a massage gun handle 18. The end of the massage gun handle 18 can define a massage gun arm attachment end 16.

A massage gun arm 20 (also referred to simply as arm 20) can include a massage gun attachment end 22 for removably connecting to the massage gun arm attachment end 16 of the massage gun 12. Details illustrating one embodiment of such an interconnection is described in greater detail below.

The arm 20 can include a handle portion 26 connected to a bent portion 25. A bend 24 that bends the arm 20 between about 60 and about 120 degrees, often between about 80 and 100 degrees and typically about 90 degrees. The handle portion 26 can extend distally (relative the massage gun attachment end 22) from the bent portion 25. In some embodiments, a pivot joint 28 may be provided between the handle portion 26 and the bent portion 25, permitting the arm 20 to be folded as FIG. 11, for example.

Referring specifically to FIGS. 5 through 11 and 15, exemplary connection ends of the handle portion 26 (FIG. 5) and the bent portion 25 (FIG. 6) are shown. Tabs 44 on the handle portion 26 may align with slots 44 in the bent portion 25 to align the components together and help ensure a strong joint when in the deployed (non-folded) configuration.

The handle portion connection end can include a pivot member 30 having a handle portion pin 34 that provides a pivoting connection between the pivot member 30 and the handle portion 26. A bent portion pin 32 can provide a pivoting connection between the pivot member 30 and the bent portion 25. The bent portion pin 32 can fit into holes 50 in the bent portion 24. Similarly, the handle portion pin 34 can fit into like holes 54 in the handle portion 26. The pivot member 30 can fit into a handle notch 58 formed in the handle member 26 and into a bent portion notch 58 in the bent portion 25. Thus, the pivot member 30 can provide two pivot axes for moving the handle portion 26 relative to the bent portion 25.

Figure 7:
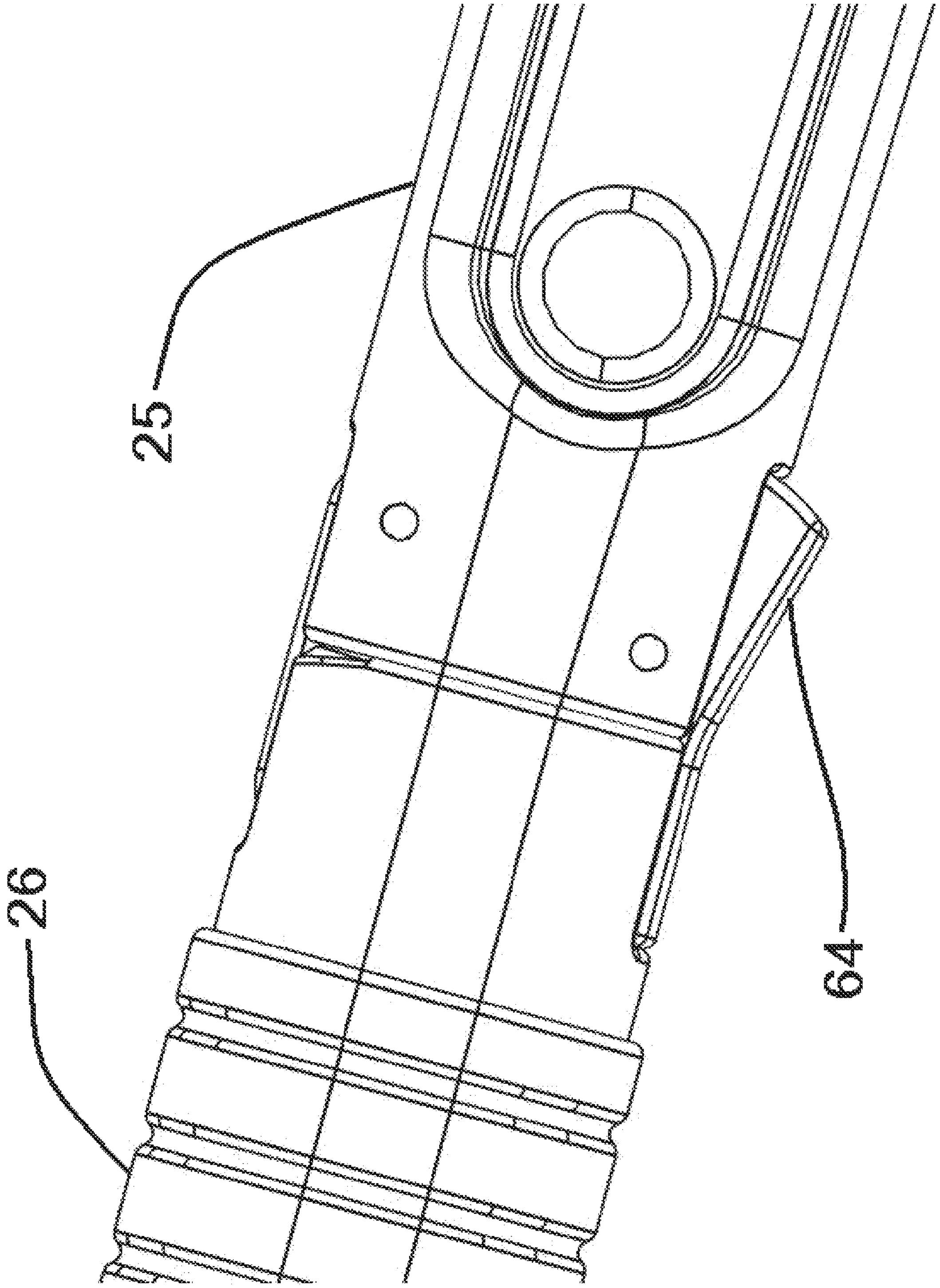
FIG. 7 illustrates a detailed side view of the pivoting connection of the massage arm of the massage gun with an angled, folding massage gun arm of FIG. 1.
Figure 8:
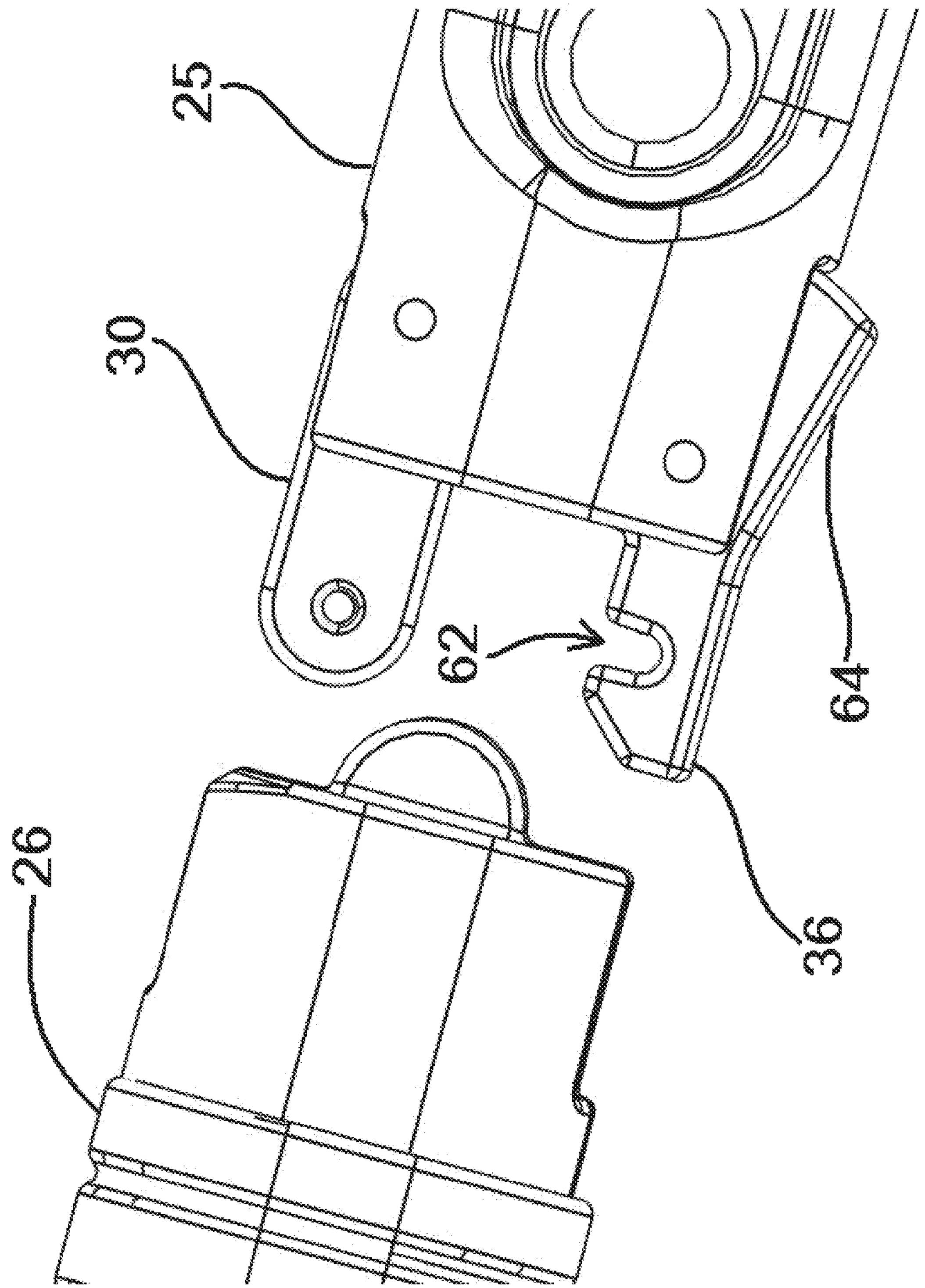
FIG. 8 illustrates a detailed, disconnected side view of the pivoting connection of the massage gun with an angled, folding massage gun arm of FIG. 1.
Figure 9:
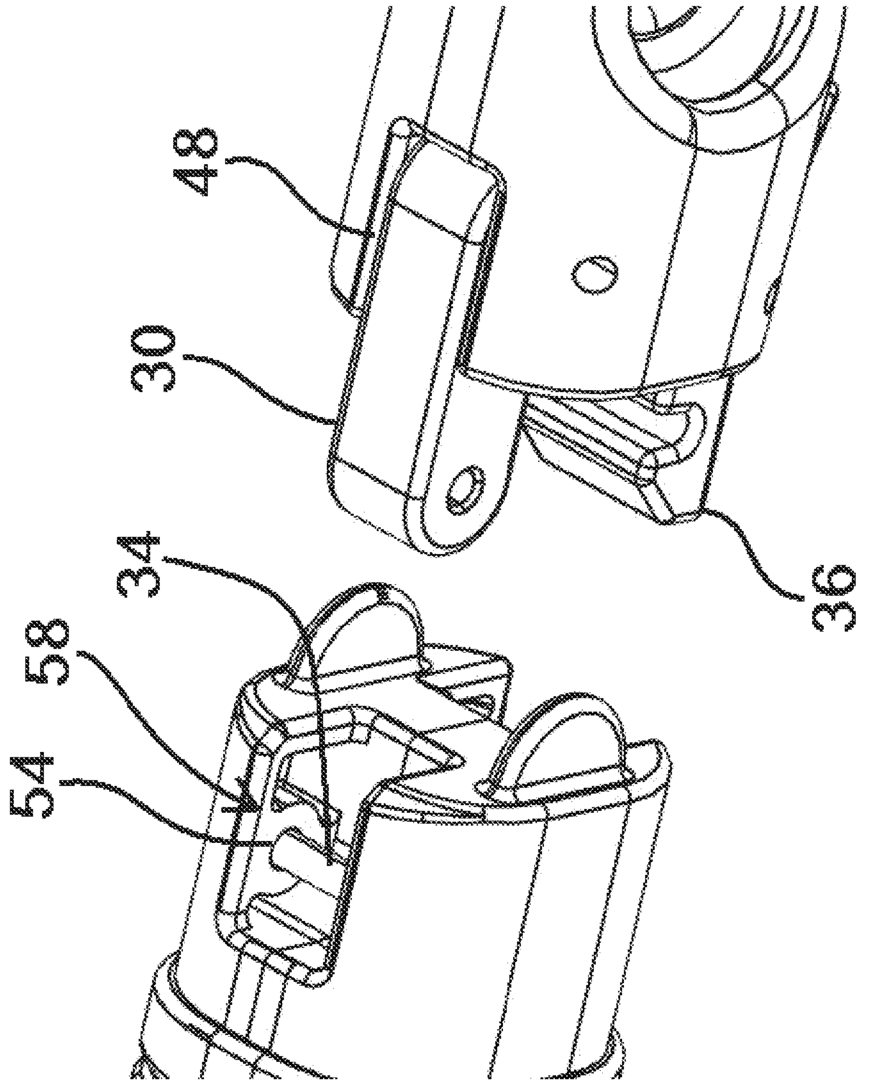
FIG. 9 illustrates a detailed, disconnected top perspective view of the pivoting connection of the massage gun with an angled, folding massage gun arm of FIG. 1.
Figure 10:
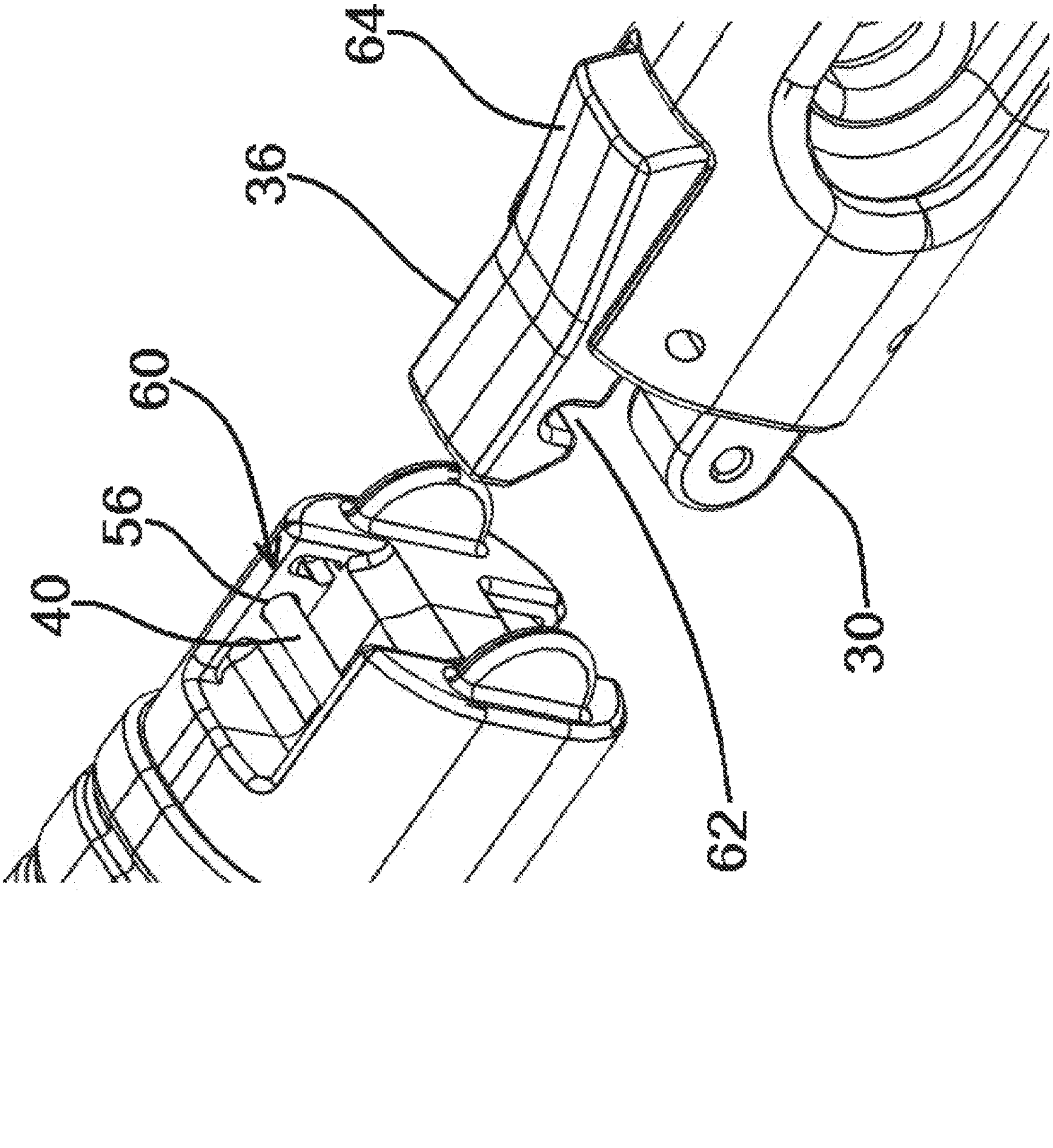
FIG. 10 illustrates a detailed, disconnected bottom perspective view of the pivoting connection of the massage gun with an angled, folding massage gun arm of FIG. 1.
Figure 11:
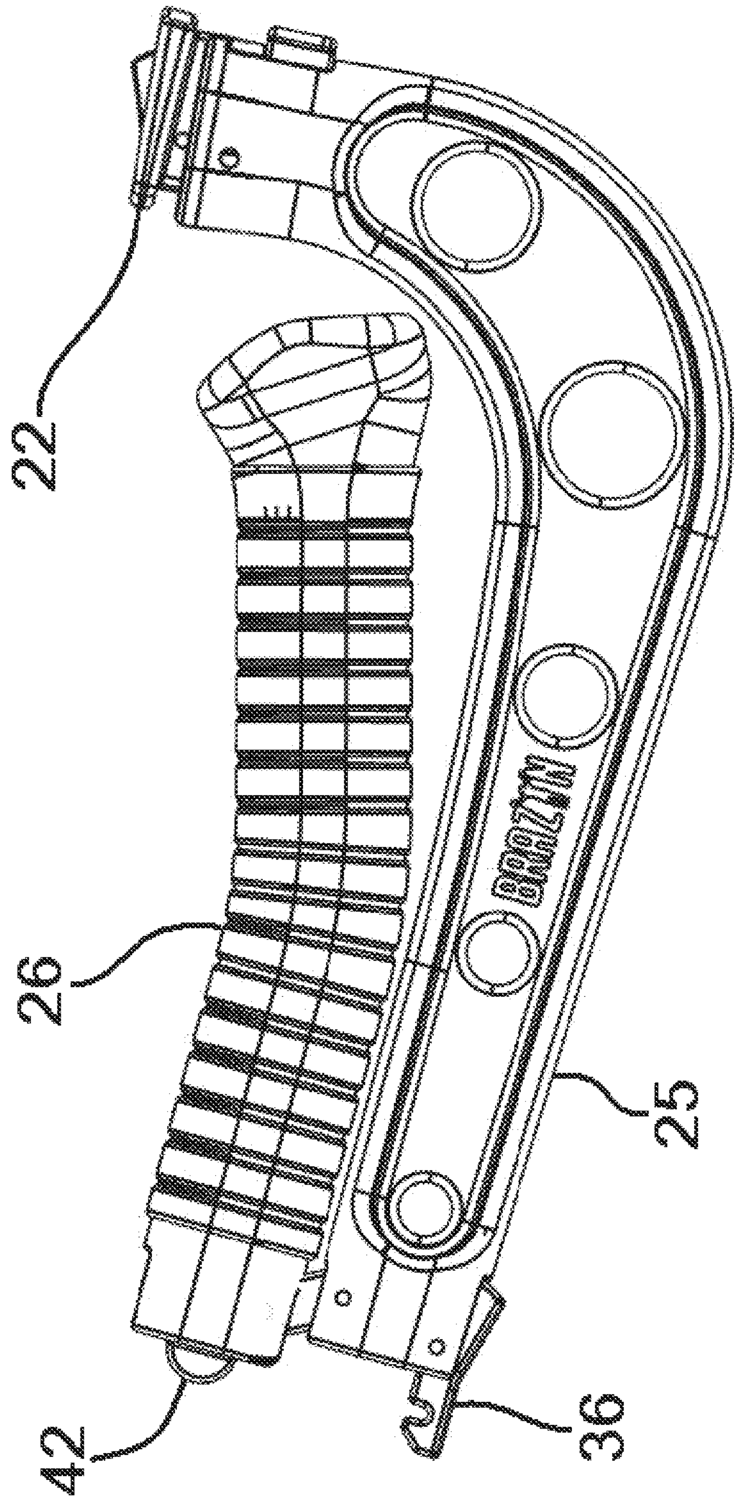
FIG. 11 illustrates a view of the massage arm, in a folded, storage configuration, of the massage gun with an angled, folding massage gun arm of FIG. 1.

A disconnect member 36 can be pivotably attached with a pin 38 to the bent portion 25 via holes 52 in the bent portion 25. A handle portion disconnect pin 40 can span between holes 58 in the handle portion 26. An insertion notch 62 can be formed in one end of the disconnect member to removably connect to the handle portion disconnect pin 40. A button portion 64 of the disconnect member 36 can provide a location for a user to depress the disconnect member 36 to cause the disconnect member to pivot on the axis provided by the pin 38, causing the insertion notch 62 to move upward and out of connection with the handle portion disconnect pin 40, permitting folding of the arm 20. As can be seen in FIG. 7, the button portion 64 may extend outward of an outer surface of the arm 20. The disconnect member 36 can be positioned in a notch 46 of the bent portion 25 and a notch 60 of the handle member 26.

Referring now to FIGS. 12 through 15, the connection between the massage gun arm attachment end 16 of the massage gun 12 and the massage gun attachment end 22 of the arm 20 is shown in greater detail.

Figure 13:
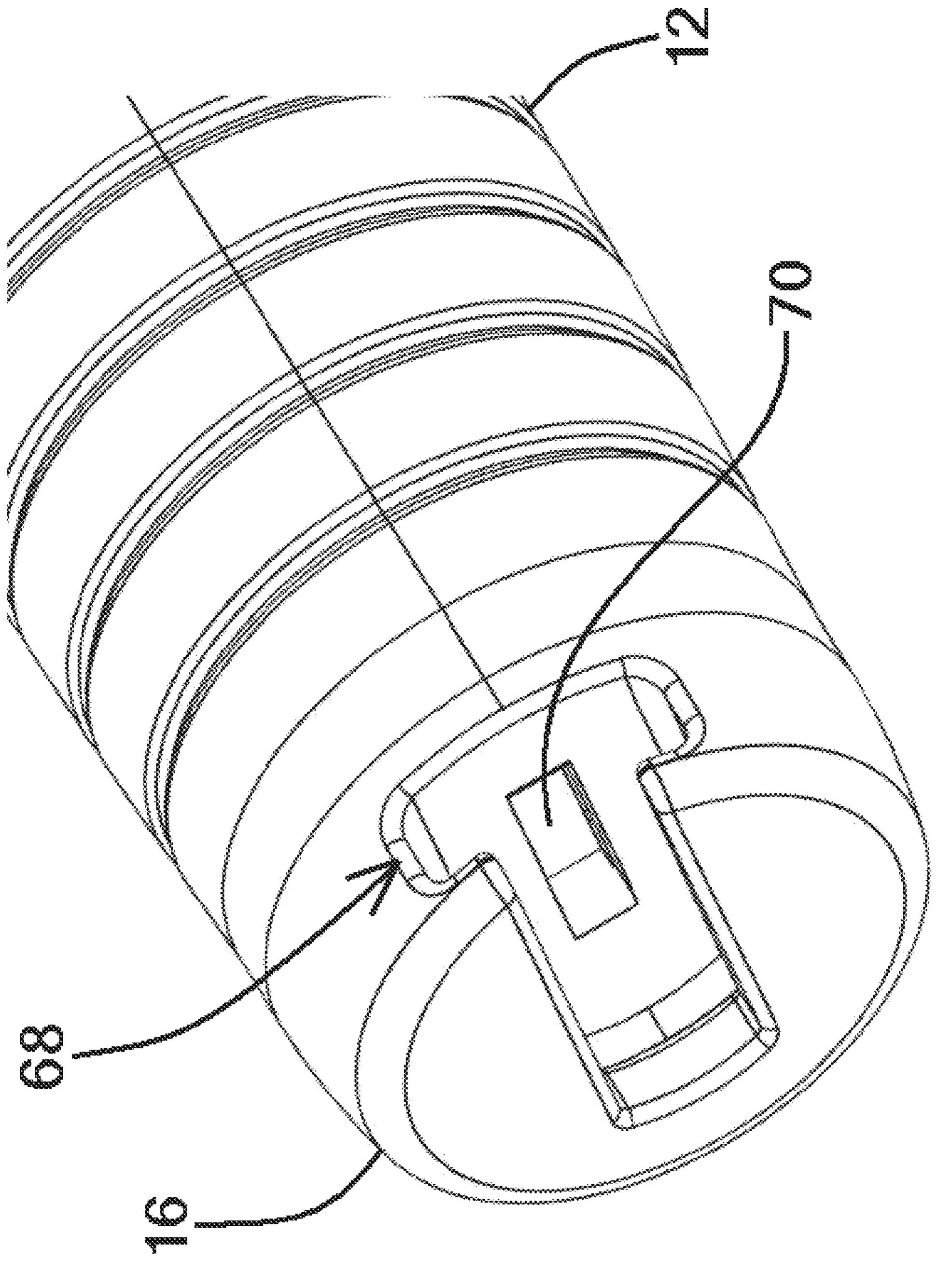
FIG. 13 illustrates a detailed end view of a massage gun arm connection end of a massage gun of the massage gun with an angled, folding massage gun arm of FIG. 1.

As shown in FIG. 13, the massage gun 12 can include a slot 68 formed generally in a T-shape that extends partially through the massage gun arm attachment end 16. An indent 70 can be provided in a surface of the slot 68. As discussed above, the massage gun arm attachment end 16 can be provided in the massage gun 12 itself or may be added to a massage gun with a universal connector, for example.

Figure 12:
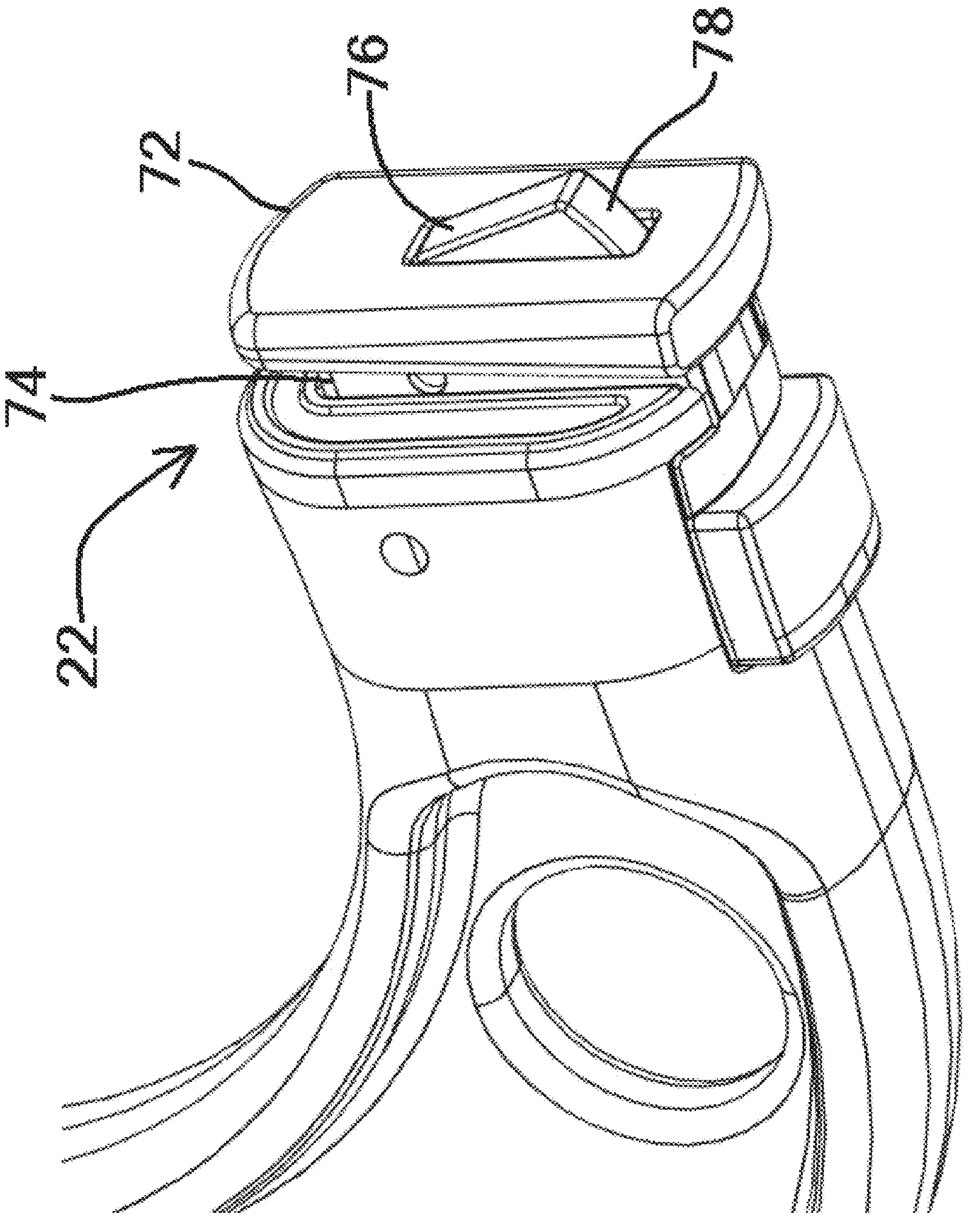
FIG. 12 illustrates a detailed end view of a massage gun connection end of the bent portion of the massage arm of the massage gun with an angled, folding massage gun arm of FIG. 1.
Figure 14:
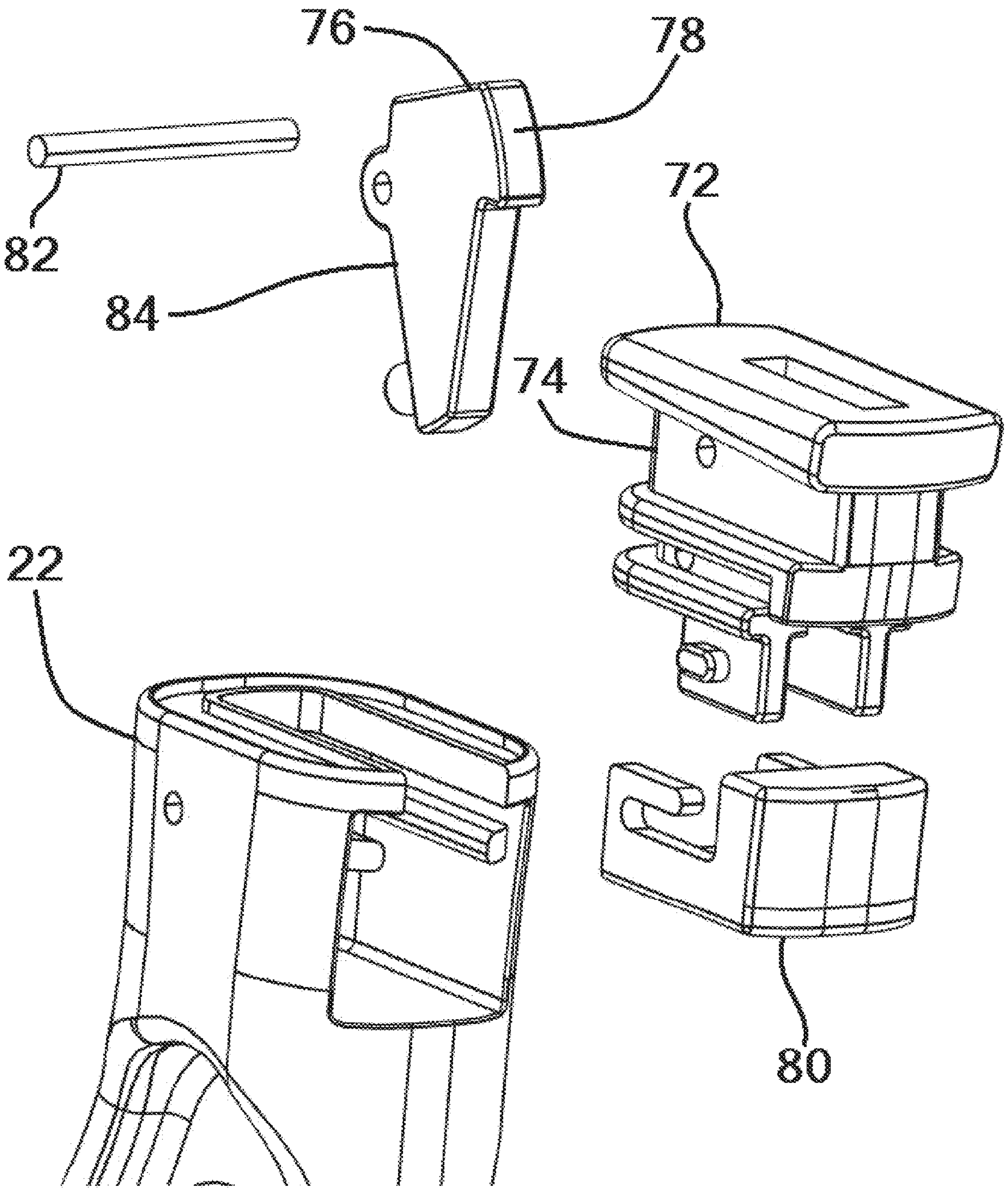
FIG. 14 illustrates an exploded view of the massage gun connection end of the bent portion of the massage arm of the massage gun with an angled, folding massage gun arm of FIG. 1.
Figure 15:
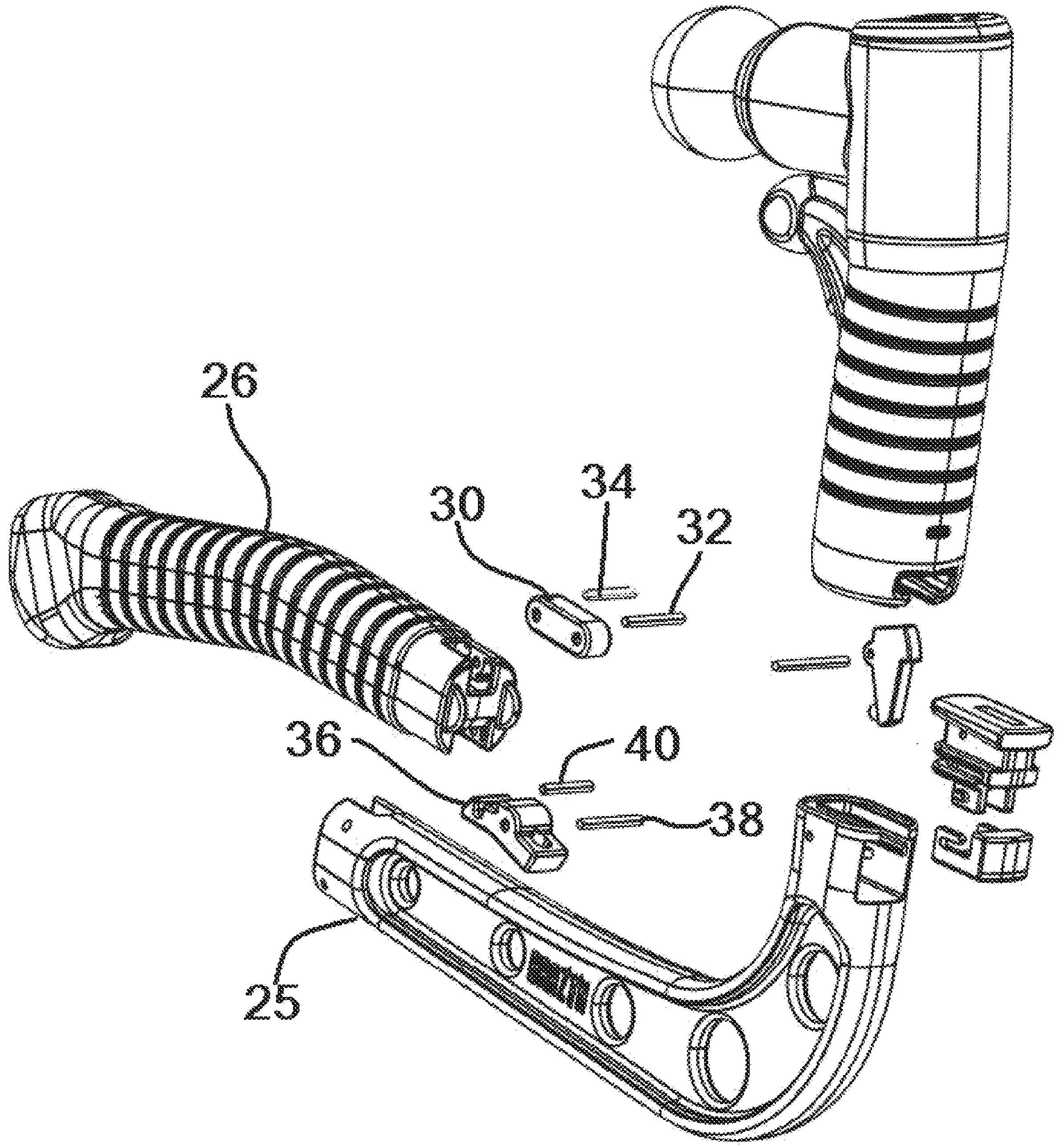
FIG. 15 illustrates an exploded perspective view of the massage gun with an angled, folding massage gun arm of FIG. 1.

As shown in FIGS. 12 and 14, the massage gun attachment end 22 can include a base member 72 extending from a smaller mount 74, thus forming a T-shape between the base member 72 and the smaller mount 74. This T-shape can fit into the T-shape provided by the slot 68 so that, when connected, the massage gun 12 cannot be pulled out of the arm 20 along an axis of the massage tun handle 18. A movable protruding member 76 can protrude from the base 72 and can include a locking surface 78 that can fit into the indent 70 of the massage gun arm attachment end 16 of the massage gun 12. Thus, the positioning of the protruding member 76 into the indent 70 can prevent separation of the massage gun 12 from the arm 20 in a direction opposite to that where the massage gun 12 is slid onto the arm 20 (through sliding engagement of the T-shaped slot 68 and the T-shape formed by the base 72 and the smaller mount 74).

A button 80 is provided that may slide to engage with an extension 84 of the protruding member 76, causing the extension 84 to pivot on an axis 82. When the button 80 is depressed, the protruding member 76 may be generally flush with the base 72 (where generally flush allows some protrusion of the protruding member 76 from the base 72, so long as the locking surface 78 no longer engages with the indent 70), permitting removal of the massage gun 12 from the arm 20. In some embodiments, the button 80 may be urged (by a spring, for example) in a non-depressed position, where the protruding member 76 remains protruding from the base 72 unless the user physically presses the button 80.

Figure 16:
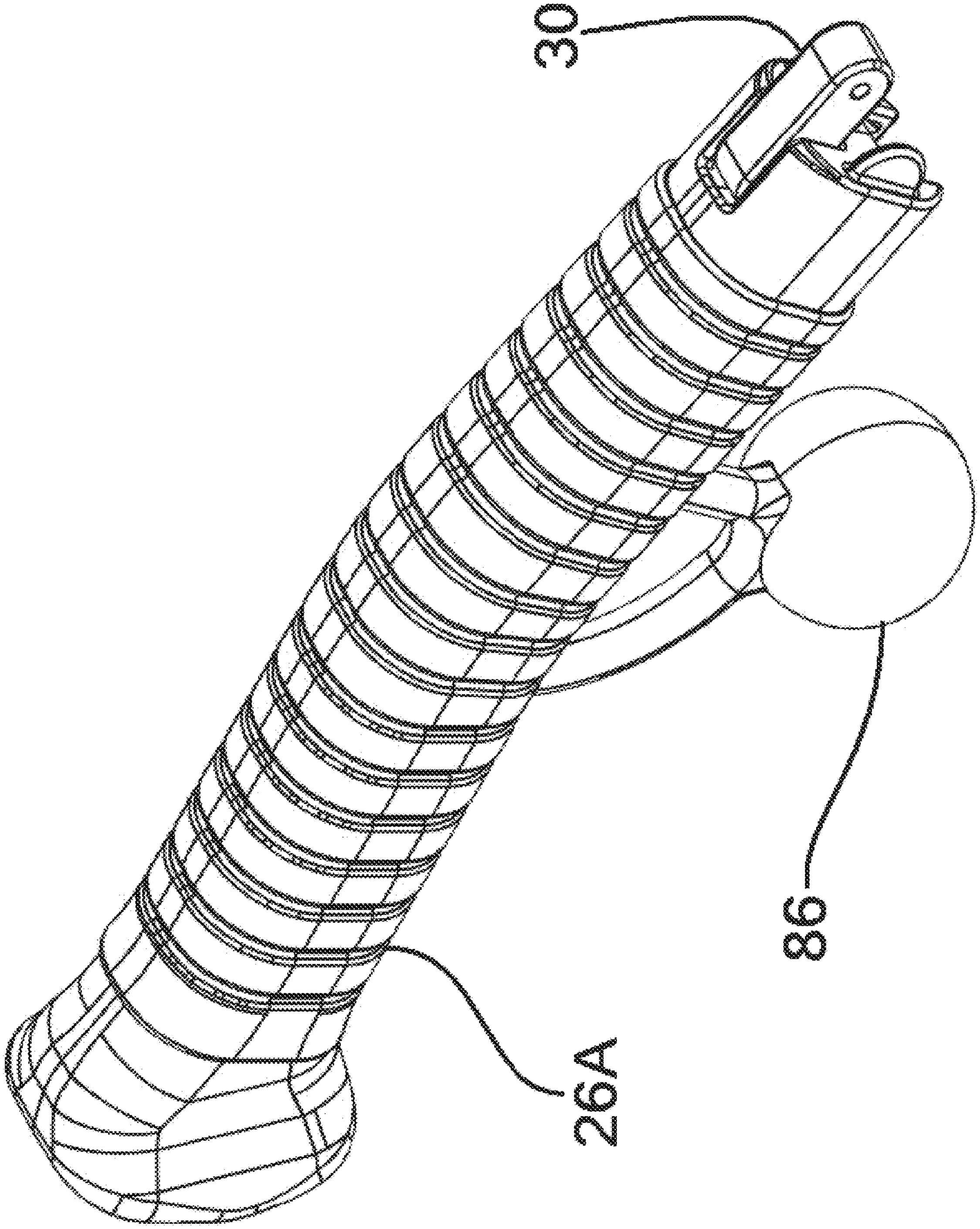
FIG. 16 illustrates a perspective view of an alternate handle member having a myo-fascial scraper, according to an exemplary embodiment of the present invention.
Figure 16A:
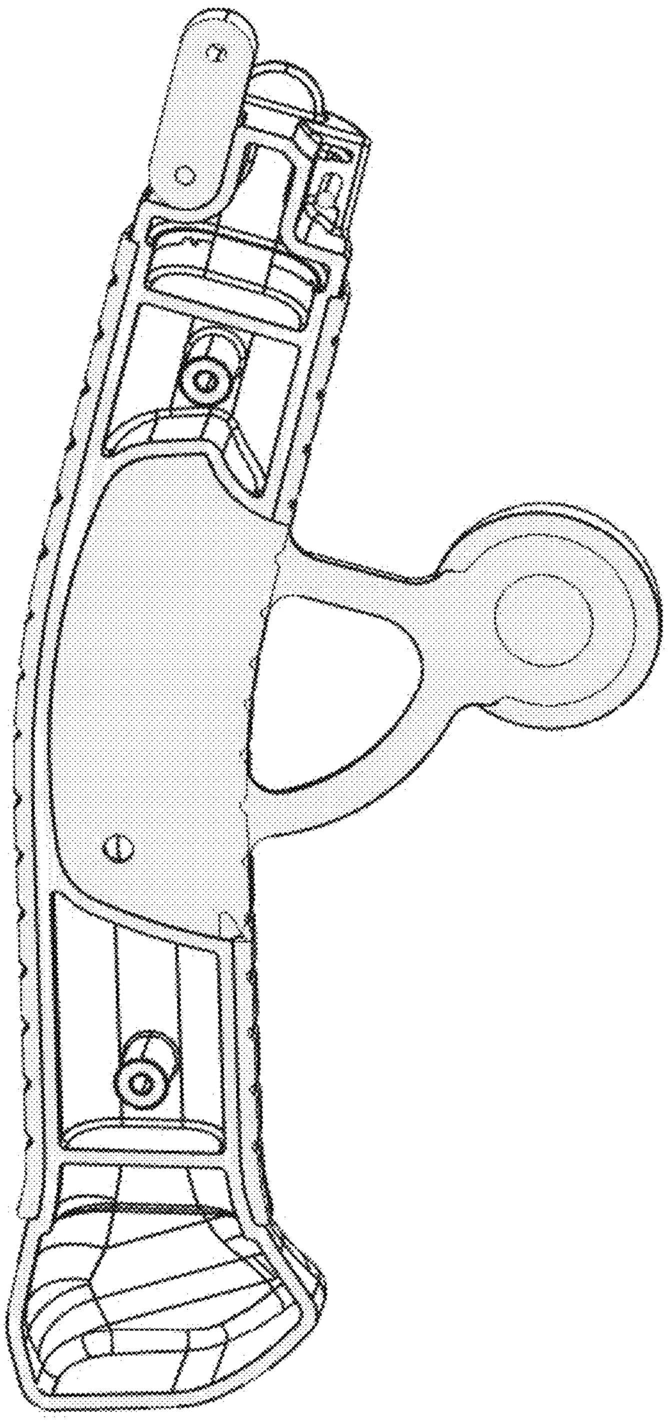
FIG. 16A illustrates a cut-away view of the handle member with the scraper tool nested therein.

Referring now to FIGS. 16 and 16A, an alternate handle portion 26A can be used with the arm 20, as described above. The handle portion 26A can include a myo-fascial scraper tool 86 (also referred to as a gua sha tool) attached to the handle portion 26. In some embodiments, as shown, the scraper tool 86 can extend from the handle portion 26A at a side opposite the pivot member 30. Thus, the arm 20 may bend away from the scraper tool 86 when the handle portion 26A is attached to the arm 20. As can be seen from FIG. 16A, the scraper tool 86 can be nested inside the handle portion 26A in a secure manner in order to allow the scraper tool 86 to act as a secondary grip for the extension arm, allowing the user to provide a force to the scraper tool 86 to provide additional force of the massage gun head against the body.

Figure 17:
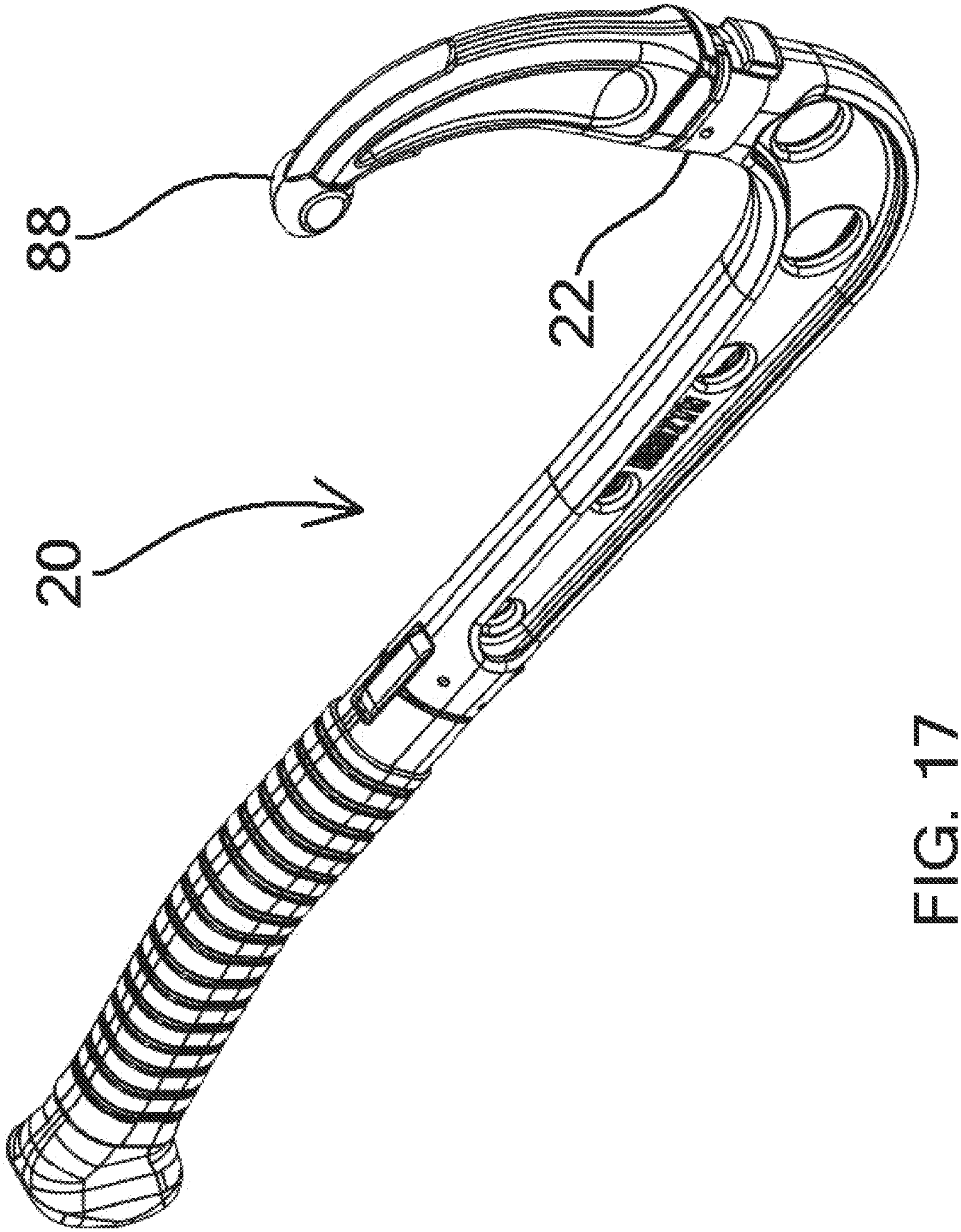
FIG. 17 illustrates a perspective view of a hook head on the folding massage arm of FIG. 1.
Figure 18:
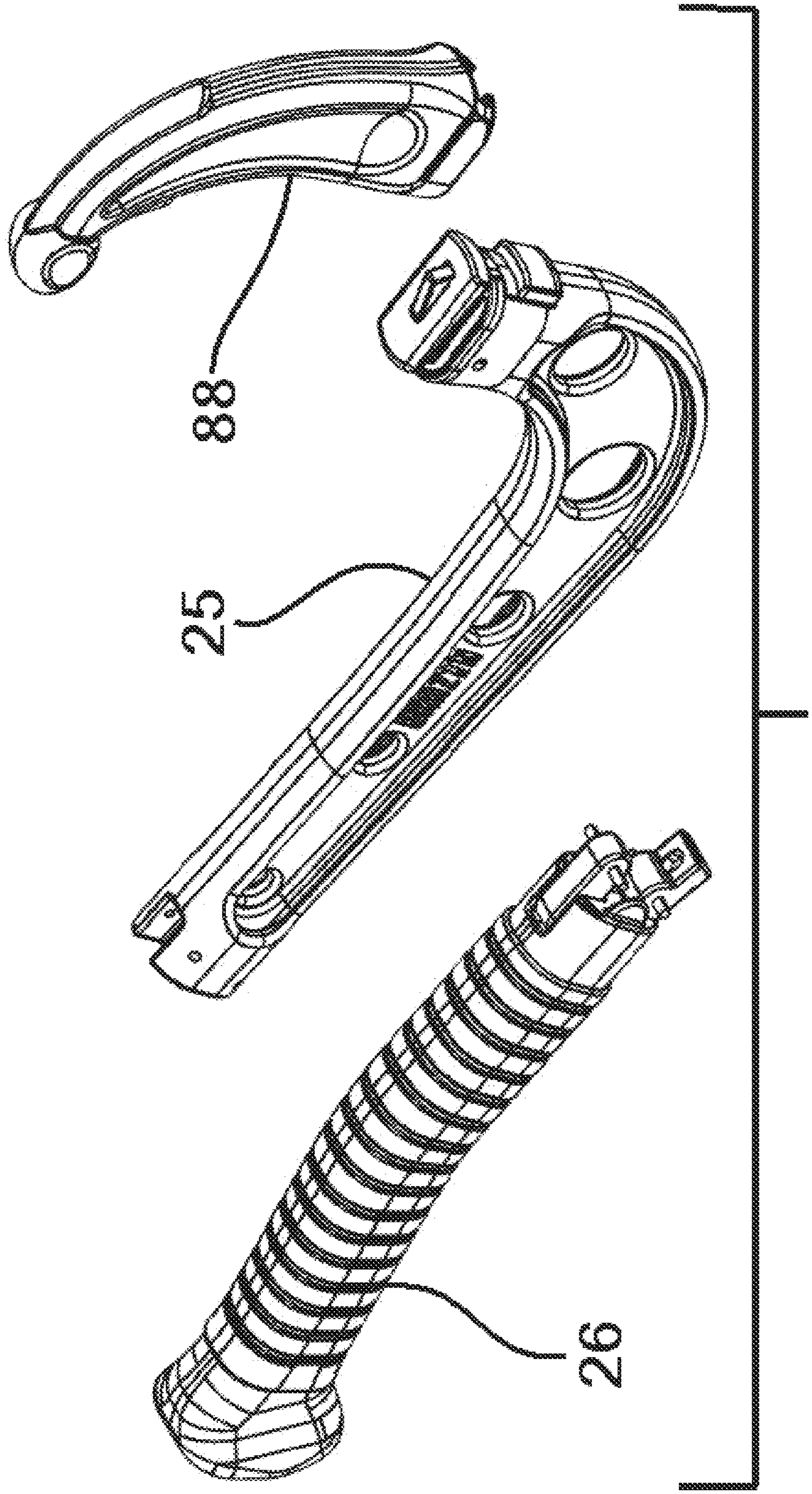
FIG. 18 illustrates an exploded perspective view of the hook head system of FIG. 17.
Figure 19:
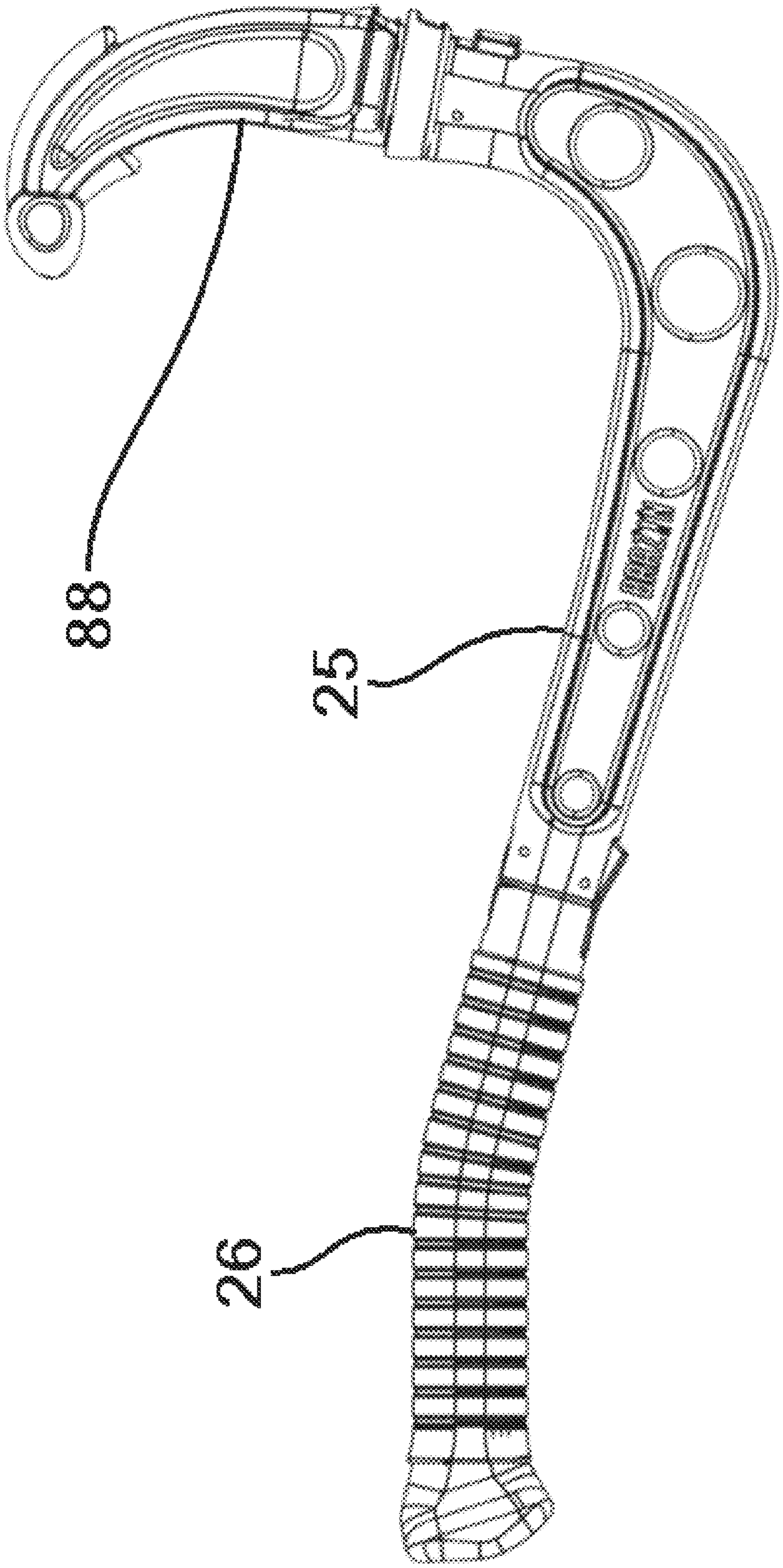
FIG. 19 illustrates a perspective view of a hook head on the folding massage arm of FIG. 1.

Referring to FIGS. 17 through 19, in place of the massage gun, a hook head 88, also referred to as a cane massage head, may be provided on the massage gun attachment end 22 of the arm 20. Various shapes of the hook head 88 may be provided, as well as different sizes, lengths and the like. The hook head 88 may be removable by various manners, including that described above and shown in FIGS. 12 through 15.

Figure 20:
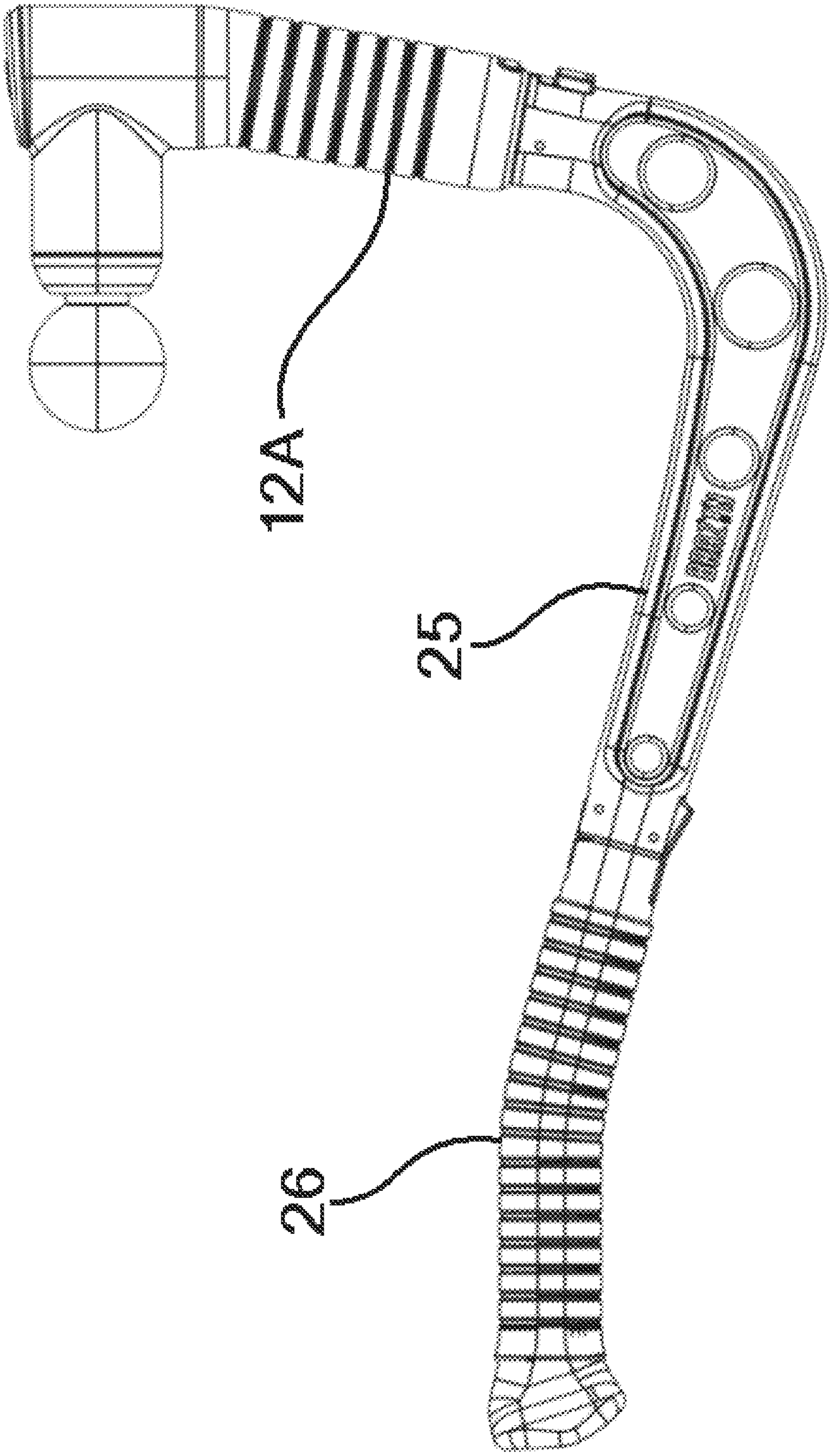
FIG. 20 illustrates a small massage gun on the folding massage arm of FIG. 1.

Referring to FIG. 20, a small massage gun 12A can be used on the arm 20. As discussed above, the small massage gun 12A may be removably attached to the arm 20 by various mechanisms, including those described above and shown in FIGS. 12 through 15.

Figure 21:
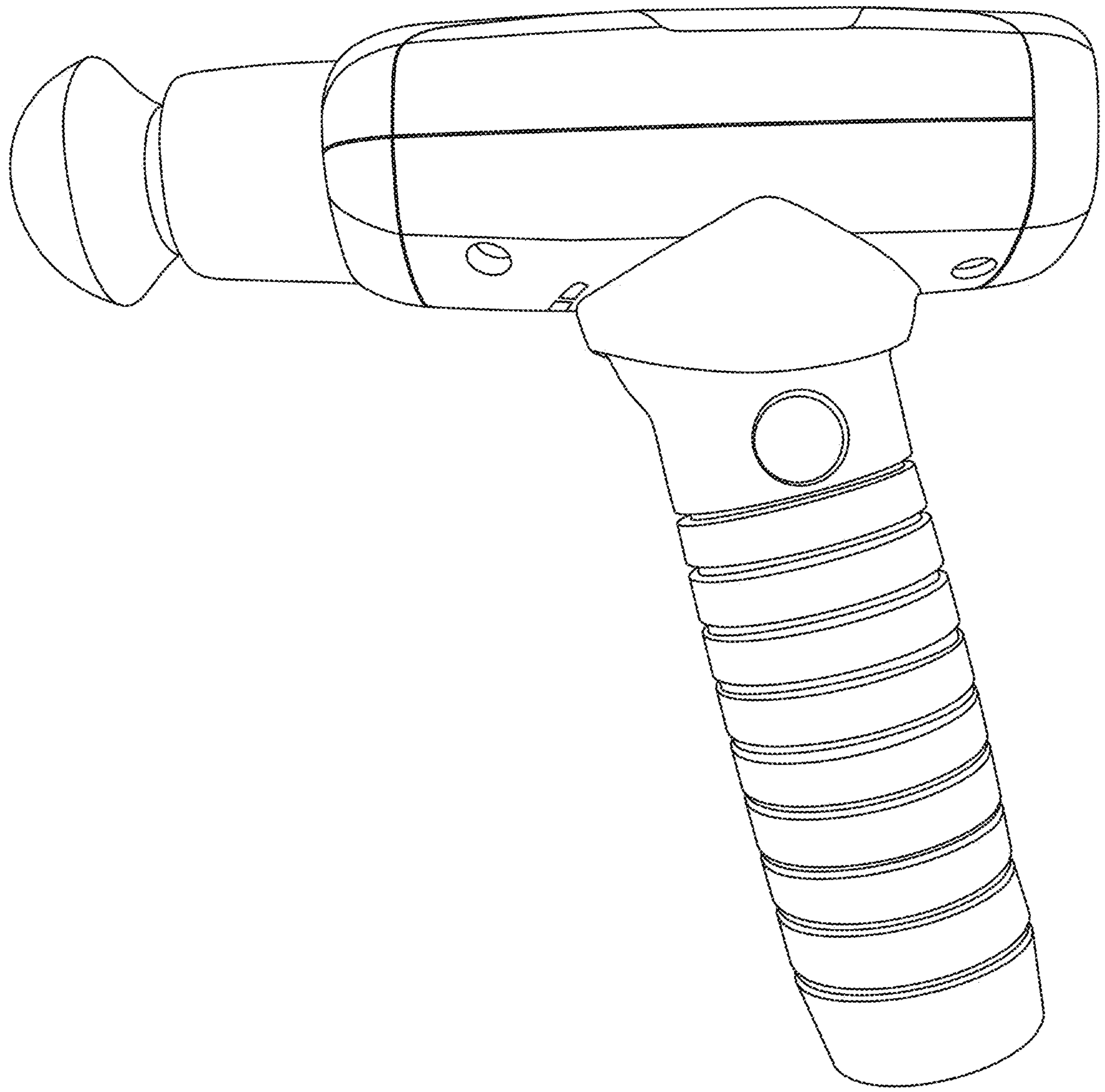
FIGS. 21 through 23 illustrates a massage gun having a pivoting handle member, according to an exemplary embodiment of the present invention.
Figure 22:
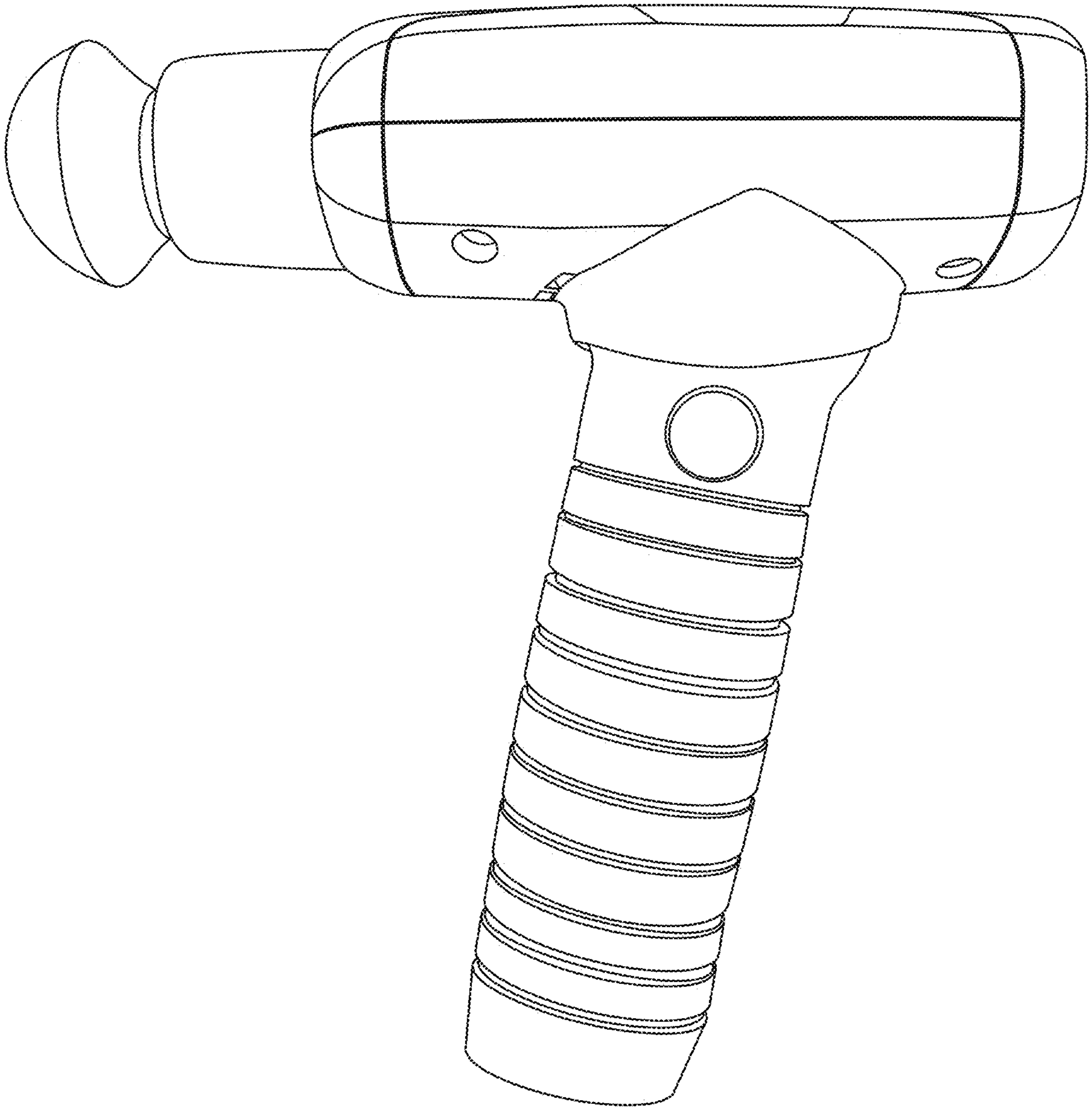
Figure 23:
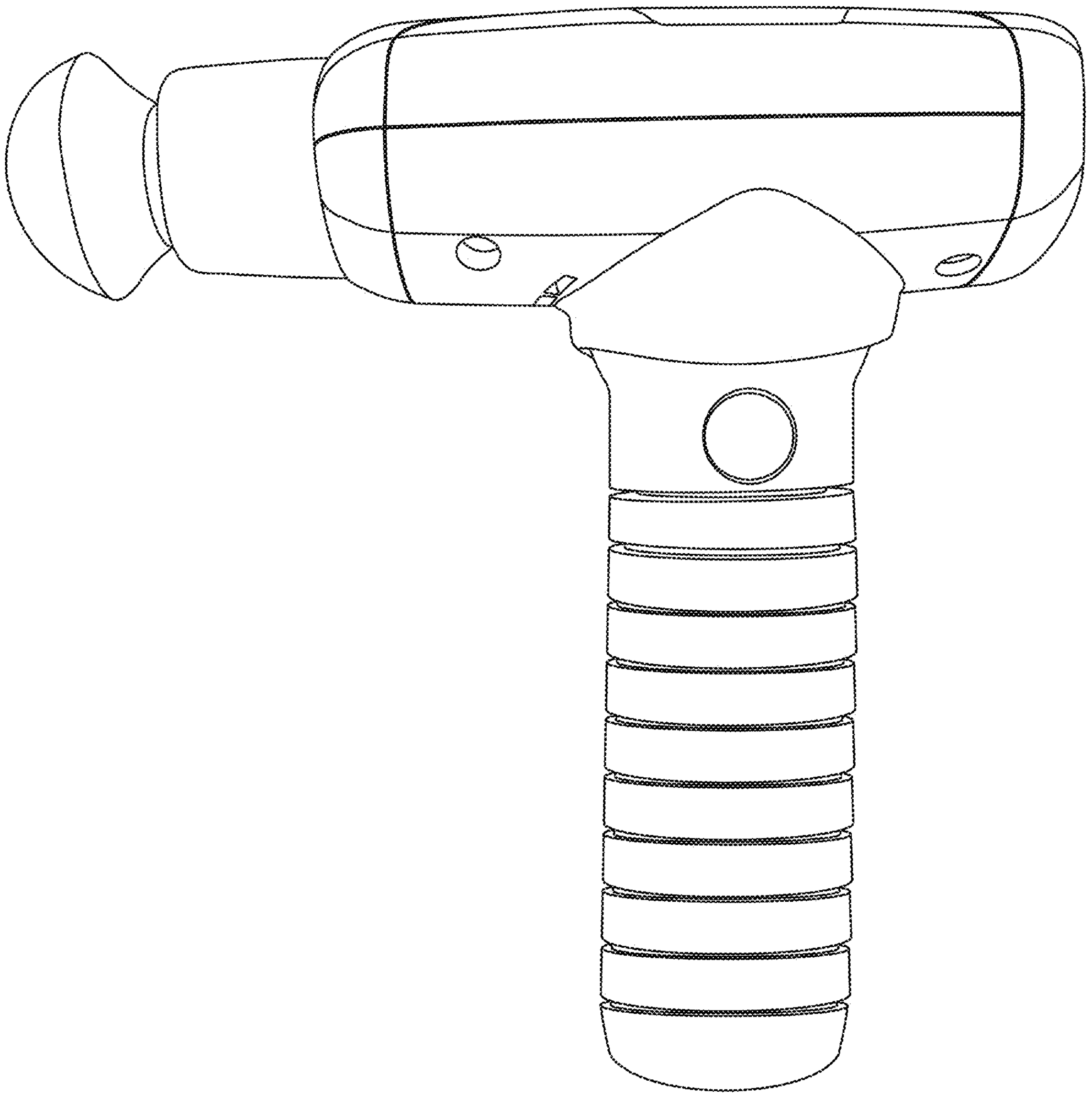
Figure 24:
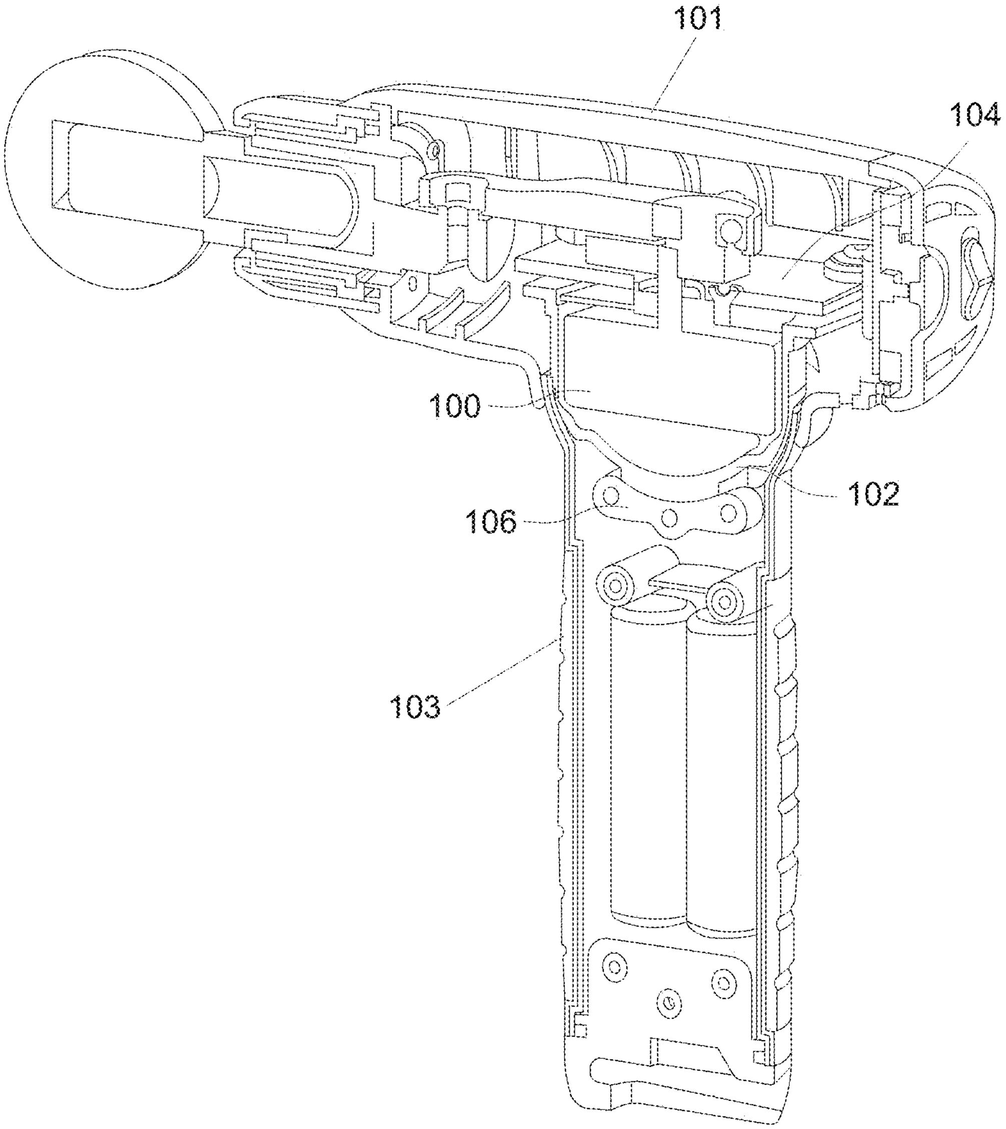
FIGS. 24 and 25 illustrate cross-sectional views of a massage gun according to an exemplary embodiment of the present invention.
Figure 25:
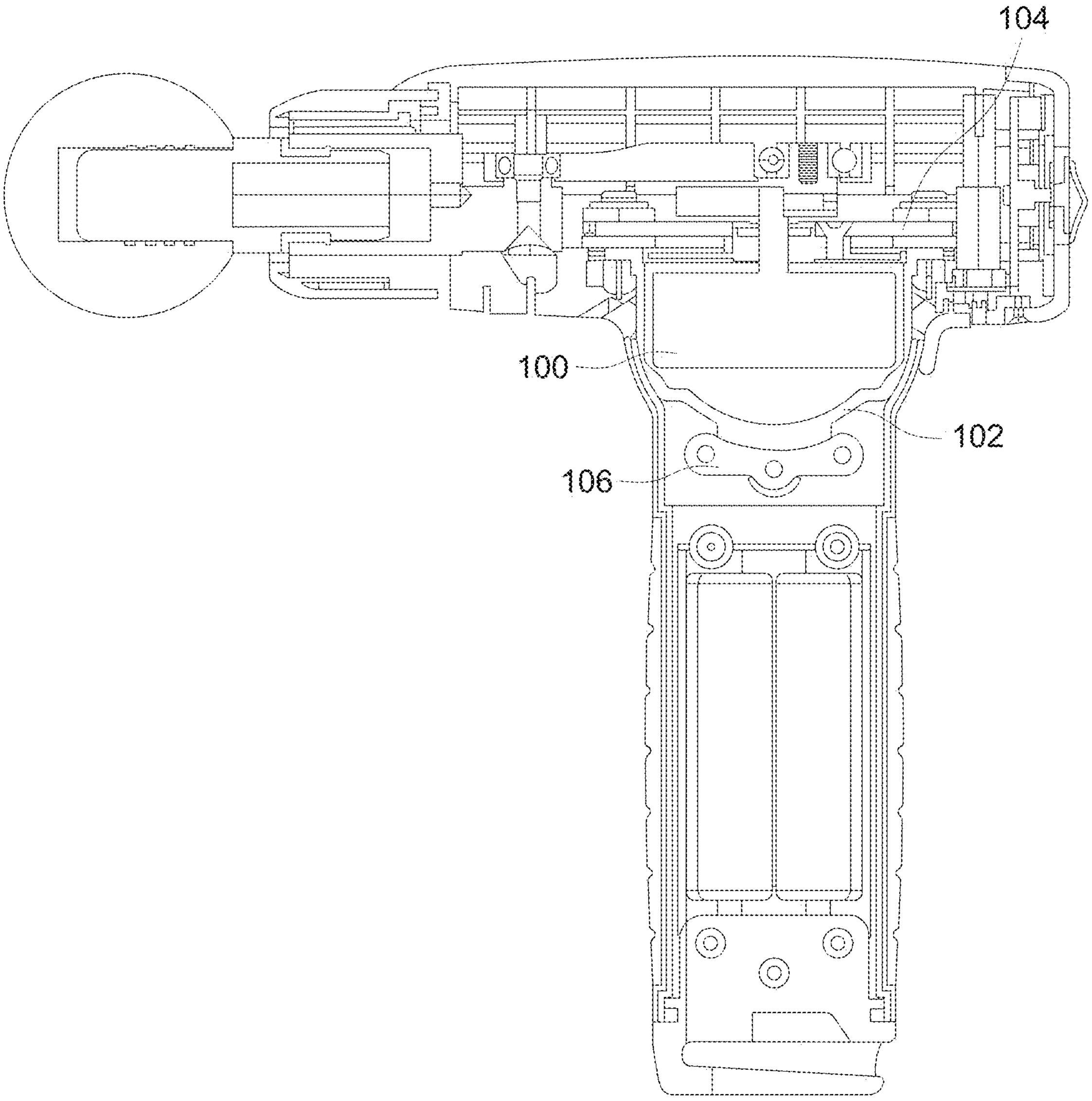
Figure 26:
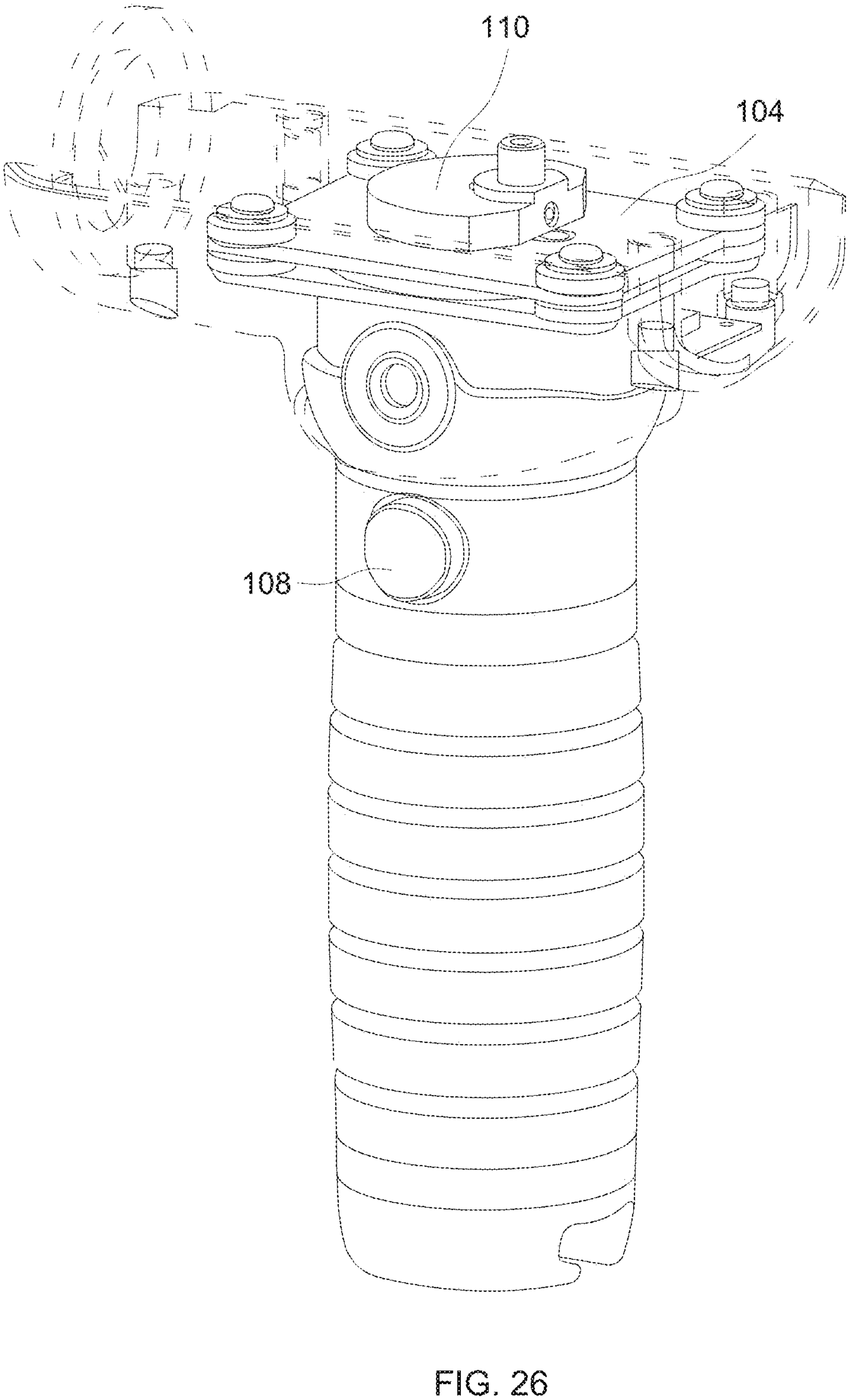
FIG. 26 illustrates a partially cut-away view of a handle portion and a motor mount of the massage gun of FIGS. 24 and 25.
Figure 27:
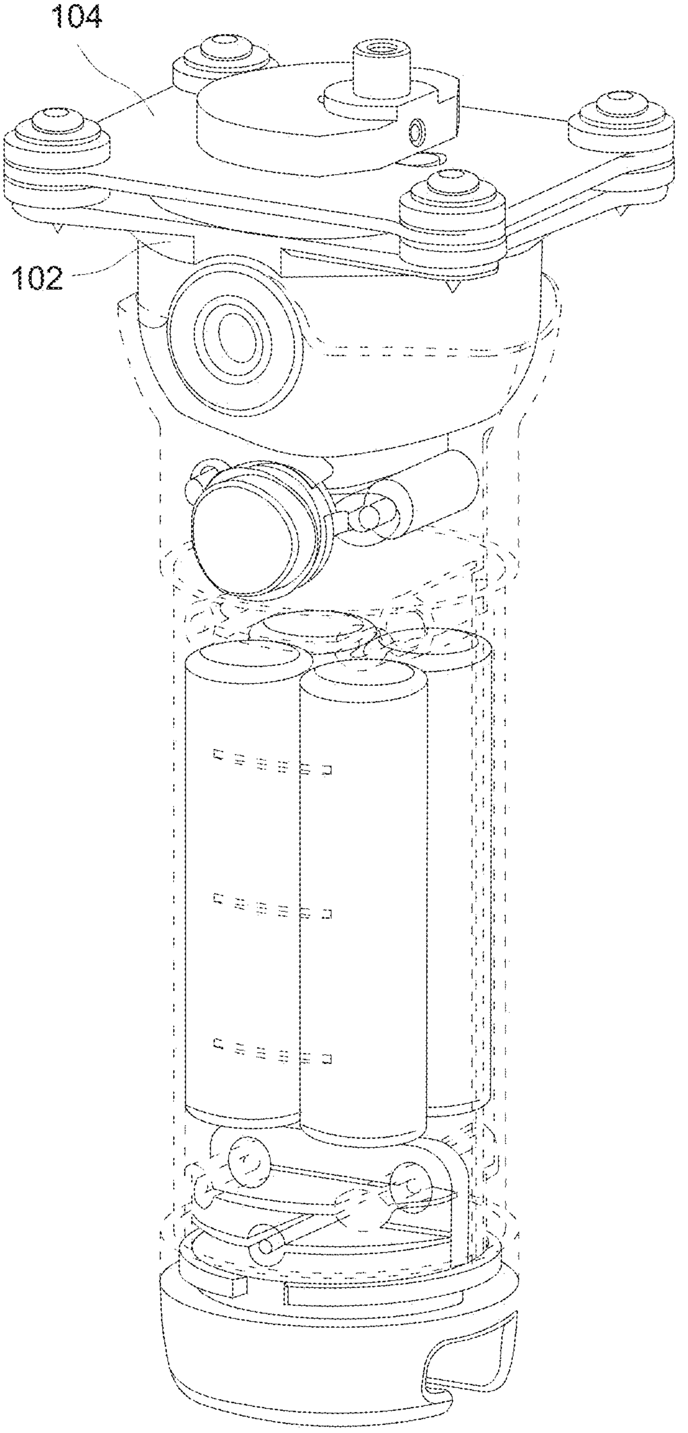
FIG. 27 illustrates a further partially cut-away view of a handle portion and a motor mount of the massage gun of FIGS. 24 and 25.
Figure 28:
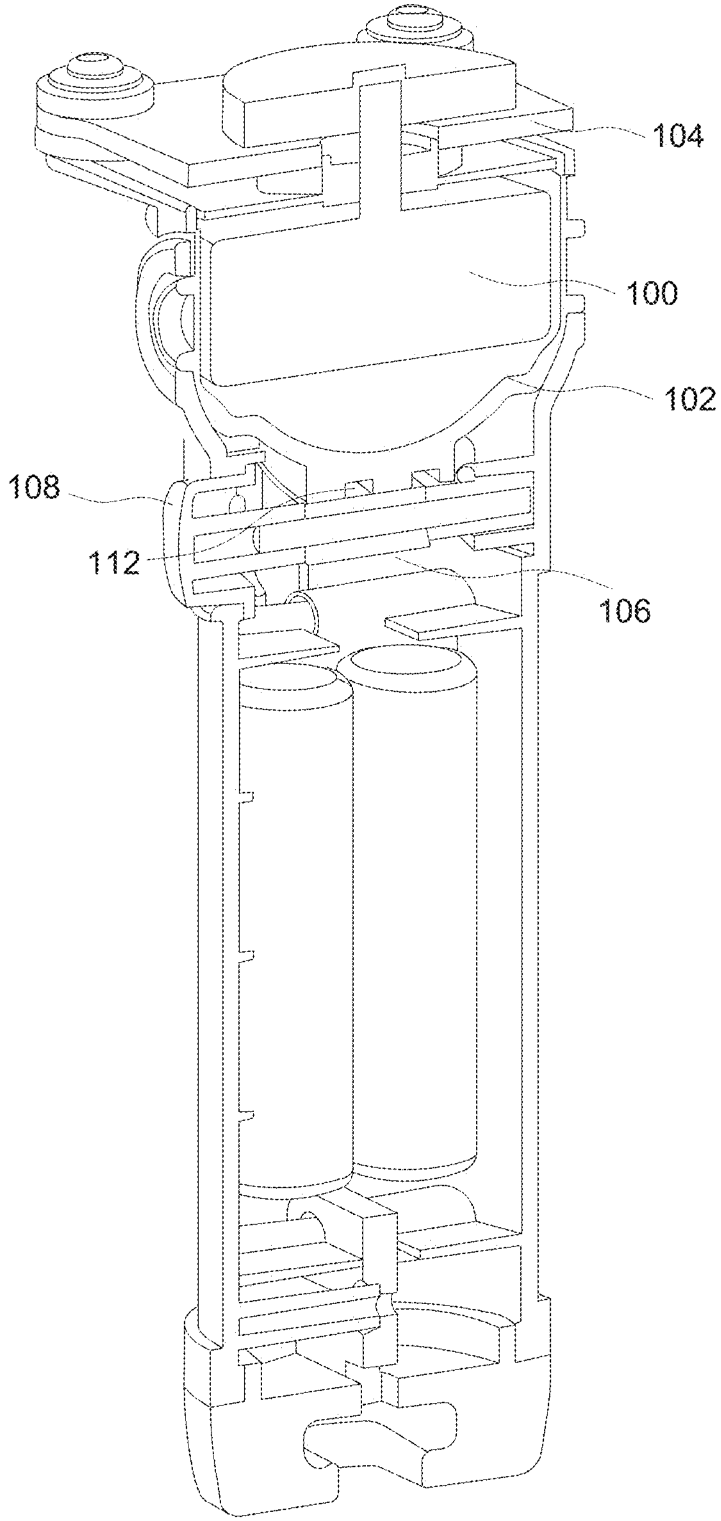
FIG. 28 illustrates a cross-sectional view of the handle portion and the motor mount of the massage gun of FIGS. 24 and 25.
Figure 29:
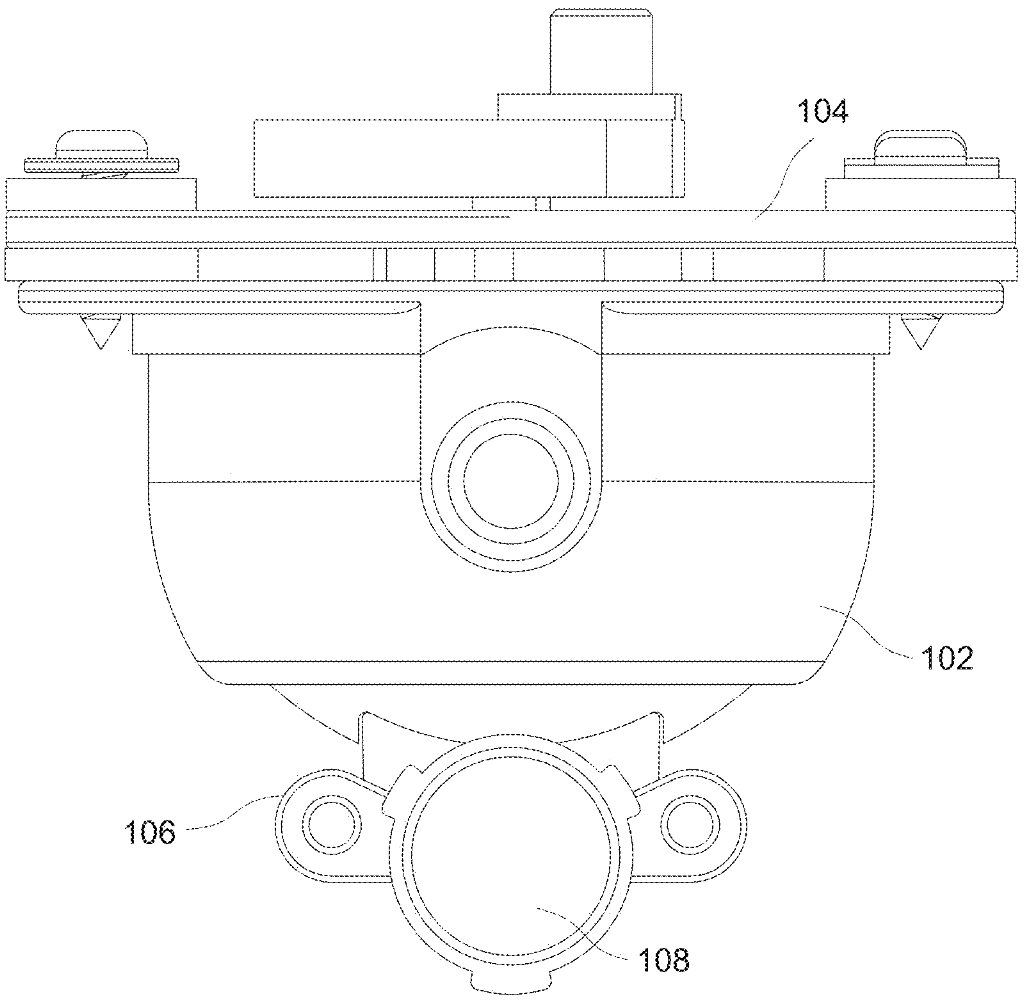
FIG. 29 illustrates a front view of a motor housing cup and an angle adjustment button for the massage gun of FIGS. 24 and 25.
Figure 30:
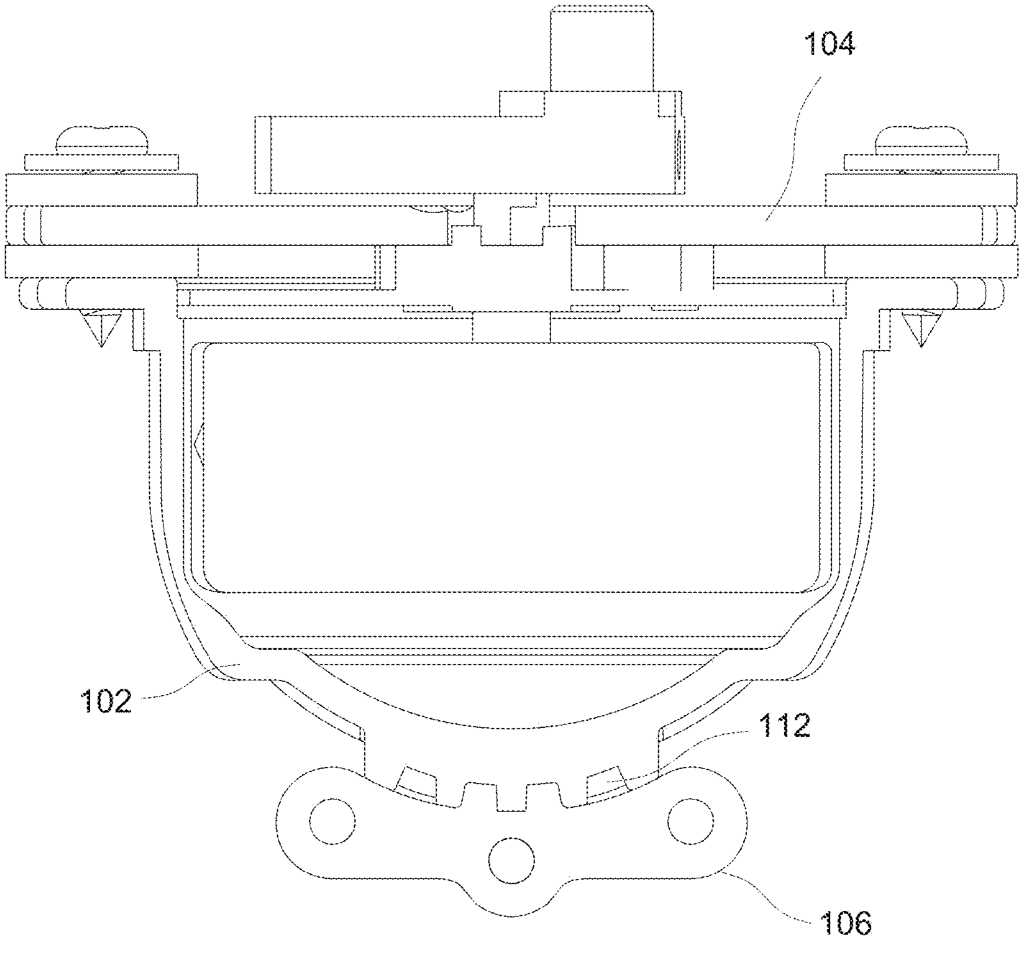
FIG. 30 illustrates a cross-sectional back view of the motor housing cup and angle adjustment mechanism of FIG. 29.

Referring now to FIGS. 21 through 23, in some embodiments, the massage gun handle may pivot. In some embodiments, the angle between the axis of the massage gun head with the axis of the massage gun handle may be about 90 degrees (FIG. 23). The axis of the massage gun handle may be angled inward as shown in FIG. 22 or outward, as shown in FIG. 21. Typically, the angle between the massage gun head axis and the massage gun handle axis may be from about 45 degrees to about 135 degrees, often from about 60 degrees to about 120 degrees, for example. The pivoting may be performed by methods known in the art, such as screw-tightening pivot pin, a push button pivot lock, or the like.

Referring now to FIGS. 24 through 30, an exemplary embodiment of a pivoting handle massage gun can include a massage gun body 101 and a handle housing 103 that can pivot relative to the massage gun body 101. A motor 100 can be mounted in a cup 102 that extends downward from the massage gun body 101 into the handle housing 103. A plate 104, disposed in the massage gun body 101, can attach and cover the cup 102 such that a motor shaft 105 can extend from the cup into the massage gun body 101. During use, the motor shaft 105 can engage with a massage head driver 110 that creates the percussion massage.

The plate 104 can be attached to the cup 102 in various manners, such as with screws or bolts, as shown, for example. An angle adjustment button 108 can extend through the handle housing 103 and can be depressible by the user to release an adjustment plate 106 from engaging with teeth 112 in the bottom of the cup 102, permitting the angle of the handle housing 103 to be adjusted. The number and pitch of the teeth 112 that mate with the adjustment plate 106 can vary, depending on how many angles are desired and the degree of each angle adjustment step. Of course, other angle adjustment methods may be used to permit this angular adjustment.

Figure 31:
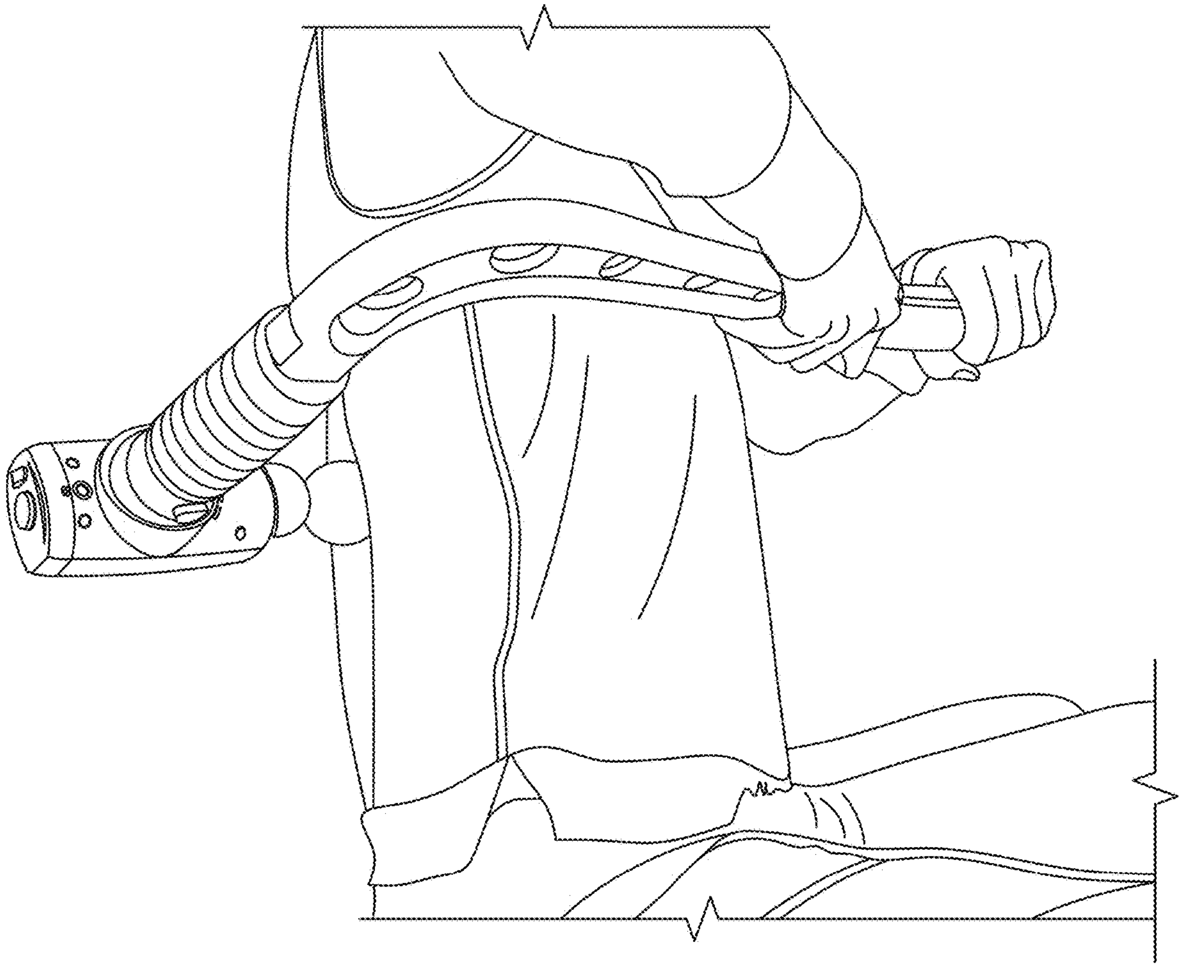
FIG. 31 illustrates a user using the massage gun/extension arm system of the present invention on their back from a side of their body.
Figure 32:
FIG. 32 illustrates a user using the massage gun/extension arm system of the present invention on their back from over a shoulder of their body.

Referring to FIGS. 31 and 32, different modes of using the massage gun extension arm are shown. The arrows in FIG. 32 illustrate how the user can pull the arm away from then and get the same force applied, in nearly the same direction, on the user's back. Thus, use of a massage gun on a user's back in intuitive, where pulling the handle at different directions or pressures causes the massage gun head to react in a similar manner. In other words, the axis of the massage gun head is roughly parallel, or within a 20-degree range of parallel, to the longitudinal axis of the extension arm handle portion. This allows the user to easily control the position and pressure of the massage gun head on their back or lower extremities.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A massage system comprising:

a massage gun extension arm including:

a handle portion having a first end and a distal end;

a bent portion having a bent portion proximate end attached to the distal end of the handle portion;

at least one fixed bend formed along the bent portion between the bent portion proximate end and a bent portion distal end, the at least one fixed bend forming a fixed, non-adjustable angle from about 60 to about 120 degrees, the at least one fixed bend forming the only possible angle in the bent portion; and a massage gun connector disposed on the bent portion distal end; and a cordless percussion massage gun removably attachable to the massage gun connector including:

a massage gun handle having a massage gun handle distal end removably attachable to the massage gun connector; and a massage head assembly having a longitudinal axis forming an angle with the massage gun handle, the longitudinal axis defining a reciprocation direction of the massage head assembly, wherein the at least one bend results in a percussion axis of a massage head of the massage head assembly being within +/−20 degrees of parallel to a longitudinal axis of the handle portion.

2. The massage system of claim 1, wherein the fixed, non-adjustable angle is about 70 to about 110 degrees.

3. The massage system of claim 1, wherein the bend is a fixed, non-adjustable bend.

4. The massage system of claim 1, further comprising:

a pivoting connection between the bent portion proximate end and the distal end of the handle portion, wherein the at least one fixed bend is formed along the bent portion between the pivoting connection and the bent portion distal end.

5. The massage system of claim 4, wherein the handle portion is foldable into a storage position, wherein the handle portion is disposed along-side of the bent portion with the handle portion first end disposed adjacent the bend without the handle portion extending above the massage gun connector.

6. The massage system of claim 4, wherein the pivoting connection includes a pivoting member with the bent portion which is disposed to pivot on a first axis at a first end of a pivoting member and the handle portion is disposed to pivot on a second axis at a second end of the pivoting member.

7. The massage system of claim 1, wherein the angle of the fixed bend is from about 80 to about 100 degrees.

8. The massage system of claim 1, further comprising a scraper tool extending from the handle portion.

9. The massage system of claim 8, wherein the scraper tool is nested inside and removable from the handle portion.

* * * * *